United States Patent
Fukutomi et al.

(10) Patent No.: US 11,882,247 B2
(45) Date of Patent: Jan. 23, 2024

(54) IMAGE ACQUISITION APPARATUS AND CAMERA BODY

(71) Applicant: OLYMPUS CORPORATION, Hachioji (JP)

(72) Inventors: Takeshi Fukutomi, Tokyo (JP); Kosuke Kajimura, Tokyo (JP); Eiji Furukawa, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 142 days.

(21) Appl. No.: 17/697,309

(22) Filed: Mar. 17, 2022

(65) Prior Publication Data

US 2022/0210331 A1 Jun. 30, 2022

Related U.S. Application Data

(63) Continuation of application No. PCT/JP2019/047376, filed on Dec. 4, 2019.

(51) Int. Cl.
  *H04N 23/68* (2023.01)
  *H04N 23/51* (2023.01)

(52) U.S. Cl.
  CPC ......... *H04N 23/6845* (2023.01); *H04N 23/51* (2023.01)

(58) Field of Classification Search
  None
  See application file for complete search history.

(56) References Cited

U.S. PATENT DOCUMENTS

| 5,754,226 A | 5/1998 | Yamada et al. |
| 5,907,353 A | 5/1999 | Okauchi |

(Continued)

FOREIGN PATENT DOCUMENTS

| EP | 1640908 A1 | 3/2006 |
| JP | H08265626 A | 10/1996 |

(Continued)

OTHER PUBLICATIONS

"Super-Resolution Considering Registration Error", General Lecture Collection of Forum on Info. Technology, The Institute of Electronics, Info. and Communication Engineers Info. and Systems Society, Info. Processing Society of Japan, 2006 5(3), pp. 63-64.
International Search Report (ISR) (and English language translation thereof) dated Feb. 10, 2020, issued in International Application No. PCT/JP2019/047376.

(Continued)

*Primary Examiner* — Mark T Monk
(74) *Attorney, Agent, or Firm* — Holtz, Holtz & Volek PC

(57) ABSTRACT

An image acquisition apparatus includes an optical system including a lens and forming a subject image; an image acquisition device having an image acquisition surface on which the subject image is formed and acquiring a plurality of images; a shifting mechanism causing the device and system to relatively shift in a direction parallel to the surface; and a processor configured to: calculate a movement amount of the subject image on the surface; calculate a relative shift amount of the device and system on the basis of the calculated movement amount; and cause the device and system to relatively shift, between acquisitions of the plurality of images, by the calculated shift amount. The device acquires a plurality of pre-images before acquiring the plurality of images, and the processor is configured to calculate the movement amount of the subject image from a movement amount of the subject between the plurality of pre-images.

5 Claims, 15 Drawing Sheets

(56) References Cited

U.S. PATENT DOCUMENTS

| | | |
|---|---|---|
| 6,266,086 B1 | 7/2001 | Okada et al. |
| 8,964,843 B2 | 2/2015 | Furukawa et al. |
| 9,898,803 B2 | 2/2018 | Kajimura |
| 10,026,155 B1 | 7/2018 | Furukawa |
| 10,389,952 B2 | 8/2019 | Furukawa et al. |
| 10,477,236 B2 | 11/2019 | Furukawa |
| 10,491,815 B2 | 11/2019 | Kajimura et al. |
| 11,037,310 B2 | 6/2021 | Okazawa et al. |
| 11,146,746 B2 | 10/2021 | Furukawa et al. |
| 2005/0163398 A1 | 7/2005 | Ioka |
| 2009/0033792 A1 | 2/2009 | Kano et al. |
| 2009/0129704 A1 | 5/2009 | Toda |
| 2009/0185760 A1 | 7/2009 | Okada et al. |
| 2010/0067820 A1 | 3/2010 | Yano |
| 2010/0119176 A1 | 5/2010 | Ichihashi et al. |
| 2011/0157380 A1 | 6/2011 | Yamazaki |
| 2012/0113221 A1 | 5/2012 | Yamada et al. |
| 2012/0321185 A1 | 12/2012 | Toda |
| 2013/0308877 A1 | 11/2013 | Tezuka |
| 2015/0319363 A1 | 11/2015 | Furukawa |
| 2016/0094767 A1 | 3/2016 | Yamamoto |
| 2016/0127649 A1 | 5/2016 | Tsuchiya |
| 2016/0373649 A1 | 12/2016 | Honda et al. |
| 2017/0024856 A1 | 1/2017 | Kajimura |
| 2018/0077360 A1 | 3/2018 | Furukawa et al. |
| 2018/0225810 A1 | 8/2018 | Kajimura |
| 2019/0327419 A1* | 10/2019 | Onomura ............. H04N 23/951 |
| 2020/0120271 A1 | 4/2020 | Furukawa et al. |

FOREIGN PATENT DOCUMENTS

| | | | |
|---|---|---|---|
| JP | H10056595 A | 2/1998 | |
| JP | H11225284 A | 8/1999 | |
| JP | 2000209432 A | 7/2000 | |
| JP | 2004259232 A | 9/2004 | |
| JP | 2004343222 A | 12/2004 | |
| JP | 2008293185 A | 12/2008 | |
| JP | 2009237650 A | 10/2009 | |
| JP | 2010140460 A | 6/2010 | |
| JP | 2011139169 A | 7/2011 | |
| JP | 2011199786 A | 10/2011 | |
| JP | 2015022215 A | 2/2015 | |
| JP | 2015192199 A | 11/2015 | |
| JP | 2015204599 A | 11/2015 | |
| JP | 2016181023 A | 10/2016 | |
| JP | 2017011329 A | 1/2017 | |
| JP | 2017044878 A | 3/2017 | |
| JP | 2017045273 A | 3/2017 | |
| JP | 2018050343 A | 3/2018 | |
| WO | 2007142109 A1 | 12/2007 | |
| WO | 2008143360 A1 | 11/2008 | |
| WO | 2015012076 A1 | 1/2015 | |
| WO | 2015145856 A1 | 10/2015 | |
| WO | 2015159581 A1 | 10/2015 | |
| WO | 2017064807 A1 | 4/2017 | |
| WO | 2019008692 A1 | 1/2019 | |
| WO | 2019008693 A1 | 1/2019 | |
| WO | 2019092844 A1 | 5/2019 | |

OTHER PUBLICATIONS

International Search Report (ISR) and Written Opinion dated Jan. 30, 2018 issued in International Application No. PCT/JP2017/040544 (which is a counterpart of related U.S. Appl. No. 16/203,001).

International Search Report (ISR) dated Oct. 3, 2017 (and English translation thereof) issued in International Application No. PCT/JP2017/024579 (which is a counterpart of related U.S. Appl. No. 16/715,837).

International Search Report (ISR) dated Sep. 26, 2017 (and English translation thereof) issued in International Application No. PCT/JP2017/024578 (which is a counterpart of related U.S. Appl. No. 16/715,583).

Notice of Allowance dated Jul. 9, 2021 issued in related U.S. Appl. No. 16/715,837.

Related U.S. Appl. No. 16/203,001, First Named Inventor: Kosuke Kajimura; Title: "Image-Processing Apparatus, Image-Processing Method, and Non-Transitory Computer Readable Medium Storing Image-Processing Program"; filed: Nov. 28, 2018.

Related U.S. Appl. No. 16/715,583, First Named Inventor: Eiji Fyrukawa; Title: "Image Processing Device, Image Capturing Device, Image Processing Method, and Storage Medium"; filed: Dec. 16, 2019.

Related U.S. Appl. No. 16/715,837, First Named Inventor: Eiji Furukawa; Title: "Image Processing Device, Image Capturing Device, Image Processing Method, and Storage Medium"; filed: Dec. 16, 2019.

Written Opinion (WO) dated Oct. 13, 2017 issued in International Application No. PCT/JP2017/024579 (which is a counterpart of related U.S. Appl. No. 16/715,837).

Written Opinion (WO) dated Sep. 26, 2017 issued in International Application No. PCT/JP2017/024578 (which is a counterpart of related U.S. Appl. No. 16/715,583).

Notice of Allowance dated Jul. 31, 2019, issued in related U.S. Appl. No. 16/203,001.

Office Action (Non-Final Rejection) dated Dec. 24, 2021, issued in related U.S. Appl. No. 16/715,583.

* cited by examiner

IMAGE ACQUISITION APPARATUS AND CAMERA BODY

CROSS-REFERENCE TO RELATED APPLICATIONS

This is a continuation of International Application PCT/JP2019/047376 which is hereby incorporated by reference herein in its entirety.

TECHNICAL FIELD

The present invention relates to an image acquisition apparatus and a camera body, and relates, in particular, to an image acquisition apparatus and a camera body that generate a high-resolution image by combining a plurality of images.

BACKGROUND ART

In the related art, there is a known technology for generating a high-resolution image having a greater number of pixels than the number of pixels in an image acquisition device by combining a plurality of images (for example, see Patent Literature 1). Patent Literature 1 discloses a digital still camera that performs shake correction simultaneously with image resolution enhancement of an image. With the invention described in Patent Literature 1, an image acquisition device is moved for the purpose of shake correction, while the image acquisition device is being exposed to light, and, after the exposure to light, a pixel shift in which the image acquisition device is moved by one pixel is performed for the purpose of image resolution enhancement.

CITATION LIST

Patent Literature

{PTL 1} Japanese Unexamined Patent Application, Publication No. Hei 11-225284

SUMMARY OF INVENTION

An aspect of the present invention is an image acquisition apparatus that combines a plurality of images acquired in a time sequential manner and generates a combined image having a higher resolution than each of the plurality of images, the image acquisition apparatus including: an optical system that includes a lens and that forms a subject image by focusing light coming from a subject; an image acquisition device that has an image acquisition surface on which the subject image is formed and that acquires the plurality of images; a shifting mechanism that causes the image acquisition device and the optical system to relatively shift in a direction parallel to the image acquisition surface; and a processor including hardware, the processor being configured to: calculate a movement amount of the subject image on the image acquisition surface; calculate a relative shift amount of the image acquisition device and the optical system on the basis of the movement amount of the subject image, wherein the shift amount increases with a decrease in the movement amount of the subject image; and cause, by controlling the shifting mechanism, the image acquisition device and the optical system to relatively shift, between acquisitions of the plurality of images, by the calculated shift amount, wherein the image acquisition device acquires a plurality of pre-images before acquiring the plurality of images, and the processor is configured to calculate the movement amount of the subject image on the image acquisition surface from a movement amount of the subject between the plurality of pre-images.

Another aspect of the present invention is an image acquisition apparatus that combines a plurality of images acquired in a time sequential manner and generates a combined image having a higher resolution than each of the plurality of images, the image acquisition apparatus including: an optical system that includes a lens and that forms a subject image by focusing light coming from a subject; an image acquisition device that has an image acquisition surface on which the subject image is formed and that acquires the plurality of images; a shifting mechanism that causes the image acquisition device and the optical system to relatively shift in a direction parallel to the image acquisition surface; an acceleration sensor fixed with respect to the optical system; and a processor including hardware, the processor being configured to: calculate a movement amount of the subject image on the image acquisition surface; calculate a relative shift amount of the image acquisition device and the optical system on the basis of the movement amount of the subject image, wherein the shift amount increases with a decrease in the movement amount of the subject image; and cause, by controlling the shifting mechanism, the image acquisition device and the optical system to relatively shift, between acquisitions of the plurality of images, by the calculated shift amount, wherein the processor is configured to calculate the movement amount of the subject image on the image acquisition surface from an acceleration detected by the acceleration sensor.

Further another aspect of the present invention is a camera body that combines a plurality of images acquired in a time sequential manner and generates a combined image having a higher resolution than each of the plurality of images, the camera body including: an image acquisition device that has an image acquisition surface, on which a subject image is formed by means of an optical system focusing light coming from a subject, and that acquires the plurality of images; a shifting mechanism that includes an actuator and that causes the image acquisition device to shift with respect to the optical system in a direction parallel to the image acquisition surface; and a processor including hardware, the processor being configured to: calculate a movement amount of the subject image on the image acquisition surface; calculate a shift amount of the image acquisition device on the basis of the movement amount of the subject image, wherein the shift amount increases with a decrease in the movement amount of the subject image; and cause, by controlling the shifting mechanism, the image acquisition device to shift, between acquisitions of the plurality of images, by the calculated shift amount, wherein the image acquisition device acquires a plurality of pre-images before acquiring the plurality of images, and the processor is configured to calculate the movement amount of the subject image on the image acquisition surface from a movement amount of the subject between the plurality of pre-images.

DESCRIPTION OF EMBODIMENTS

First Embodiment

An image acquisition apparatus 100 according to a first embodiment of the present invention will be described with reference to the drawings.

The image acquisition apparatus 100 has a function of combining a plurality of images acquired in a time sequential manner and generating a combined image having a higher resolution than each of the plurality of images. The image acquisition apparatus 100 is, for example, a hand-held digital camera and generates a high-resolution combined image by utilizing position displacements of a subject between the plurality of images due to movements of the image acquisition apparatus 100, such as camera shakes.

Figure 1:
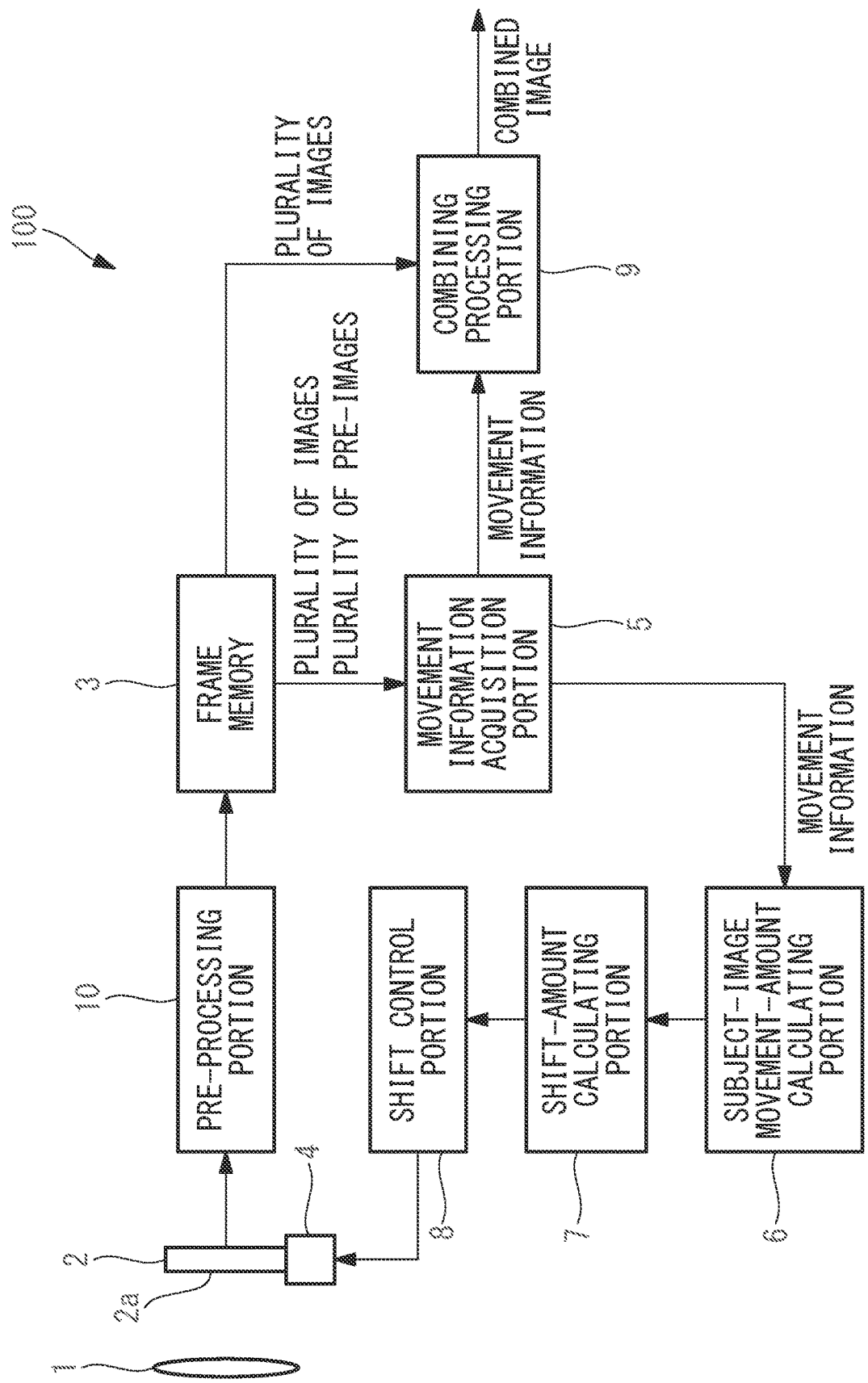
FIG. 1 FIG. 1 is a configuration diagram of an image acquisition apparatus according to a first embodiment of the present invention.

As shown in FIG. 1, the image acquisition apparatus 100 includes: an optical system 1; an image acquisition device 2; a frame memory 3; a shifting mechanism 4; a movement information acquisition portion 5; a subject-image movement-amount calculating portion (movement-amount calculating portion) 6; a shift-amount calculating portion 7; a shift control portion 8; and a combining processing portion 9.

The image acquisition apparatus 100 has a processor and a storage apparatus that stores an image processing program. The movement information acquisition portion 5, the subject-image movement-amount calculating portion 6, the shift-amount calculating portion 7, the shift control portion 8, and a combining processing portion 9 are realized by the processor and the storage apparatus. In other words, functions of the respective portions 5, 6, 7, 8, and 9, described later, are realized as a result of the processor executing processing in accordance with the image processing program. Alternatively, the functions of the respective portions 5, 6, 7, 8, and 9, described later, may be realized by means of circuits dedicated to the respective functions.

The optical system 1 includes an image acquisition lens consisting of at least one lens. The optical system 1 focuses light coming from the subject by means of the image acquisition lens and forms a subject image, which is an optical image of the subject.

The image acquisition device 2 is, for example, a CCD or CMOS image sensor. The image acquisition device 2 has an image acquisition surface 2a that is disposed at the focal position of the optical system 1 and that is orthogonal to an optical axis of the optical system 1 and the optical system 1 forms the subject image on the image acquisition surface 2a.

The image acquisition device 2 acquires the plurality of images in a time sequential manner by executing main image capturing. In addition, the image acquisition device 2 acquires a plurality of pre-images in a time sequential manner by executing pre-image capturing before performing the main image capturing, for example, immediately before performing the main image capturing. The operation of the image acquisition device 2 is controlled by a principal control portion (not shown) that controls the operation of the image acquisition apparatus 100 as a whole. For example, the image acquisition device 2 acquires the plurality of images and the plurality of pre-images by means of continuous image capturing performed by controlling an electronic shutter. Due to movements of the image acquisition apparatus 100 such as camera shakes during the main image capturing, position displacements of the subject could occur between the plurality of images. Similarly, due to movements of the mage acquisition apparatus 100 such as camera shakes during the pre-image capturing, position displacements of the subject could occur between the plurality of pre-images.

The plurality of images and the plurality of pre-images are input to the frame memory 3 from the image acquisition device 2 to be stored in the frame memory 3. A pre-processing portion 10 that applies pre-processing, such as correction processing, to the images may be provided between the image acquisition device 2 and the frame memory 3.

The shifting mechanism 4 causes the image acquisition device 2 to shift with respect to the optical system 1 in a direction parallel to the image acquisition surface 2a. As a result of the shifting of the image acquisition device 2, the subject image is moved with respect to the image acquisition surface 2a. For example, the shifting mechanism 4 has an actuator that causes the image acquisition device 2 to move in a longitudinal direction of the image acquisition surface 2a and an actuator that causes the image acquisition device 2 to move in a lateral direction of the image acquisition surface 2a. The respective actuators are, for example, piezo-electric actuators that are capable of controlling the amount by which the image acquisition device 2 moves in sub-pixel units.

The movement information acquisition portion 5 acquires, from the plurality of pre-images stored in the frame memory 3, movement information containing the movement amounts of the subject between the plurality of pre-images and outputs the movement information to the subject-image movement-amount calculating portion 6. For example, the movement information acquisition portion 5 detects motion vectors between two pre-images as the movement information.

In addition, the movement information acquisition portion 5 acquires, from the plurality of images stored in the frame memory 3, movement information of the subject between the plurality of images and outputs the movement information to the combining processing portion 9. For example, the movement information acquisition portion 5 sets one of the plurality of images as a reference image and detects motion vectors between the reference image and each of the other images as the movement information.

The subject-image movement-amount calculating portion 6 acquires the movement information between the plurality of pre-images from the movement information acquisition portion 5 and calculates the movement amount of the subject image on the image acquisition surface 2a on the basis of the movement information. The calculated movement amount of the subject image on the image acquisition surface 2a decreases with a decrease in the movement amounts of the subject between the pre-images. For example, the subject-image movement-amount calculating portion 6 converts the magnitudes of the motion vectors between two pre-images to the movement amount of the subject image on the image acquisition surface 2a. The calculated movement amount is output to the shift-amount calculating portion 7.

Figure 2A:
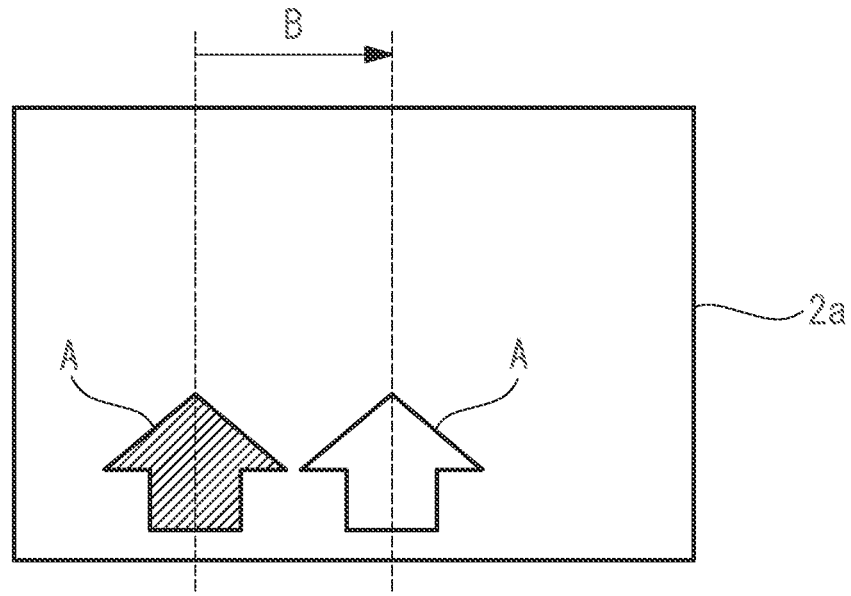
FIG. 2A is a diagram for explaining the movement amount of a subject image on an image acquisition surface in the case in which the movement of the image acquisition apparatus is small during pre-image capturing.
Figure 2B:
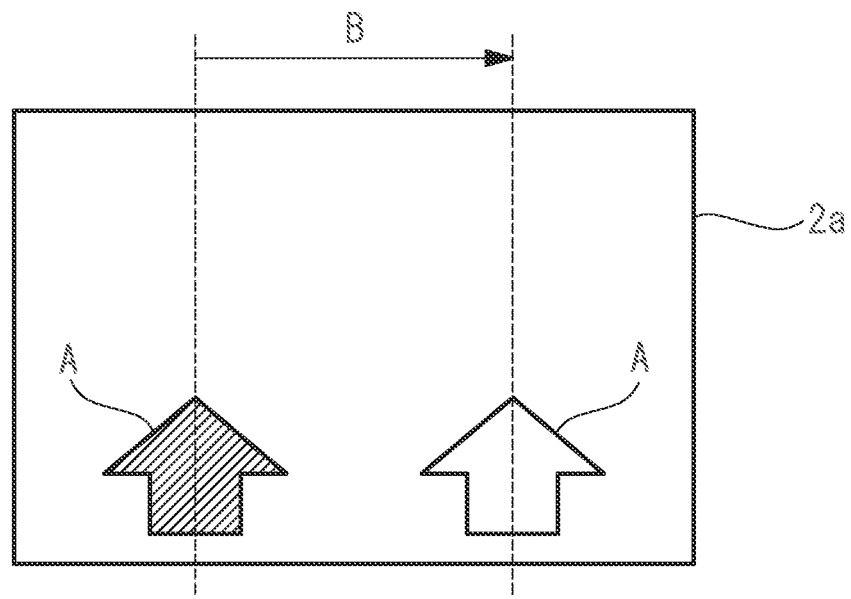
FIG. 2B is a diagram for explaining the movement amount of the subject image on the image acquisition surface in the case in which the movement of the image acquisition apparatus is large during the pre-image capturing.

FIGS. 2A and 2B show examples of the movement amount of a subject image A on the image acquisition surface 2a. The subject image A that is filled with hatching is a subject image at the time of acquiring a first pre-image, and the subject image A that is not filled is a subject image at the time of acquiring a second pre-image. Arrows B represent the movement amounts of the subject image A and correspond to the motion vectors between the pre-images calculated by the movement information acquisition portion 5. FIG. 2A shows a case in which the movement of the subject image A on the image acquisition surface 2a is small and the length of the motion vector B is short. FIG. 2B shows a case in which the movement of the subject image A on the image acquisition surface 2a is large and the length of the motion vector B is long.

Figure 3:
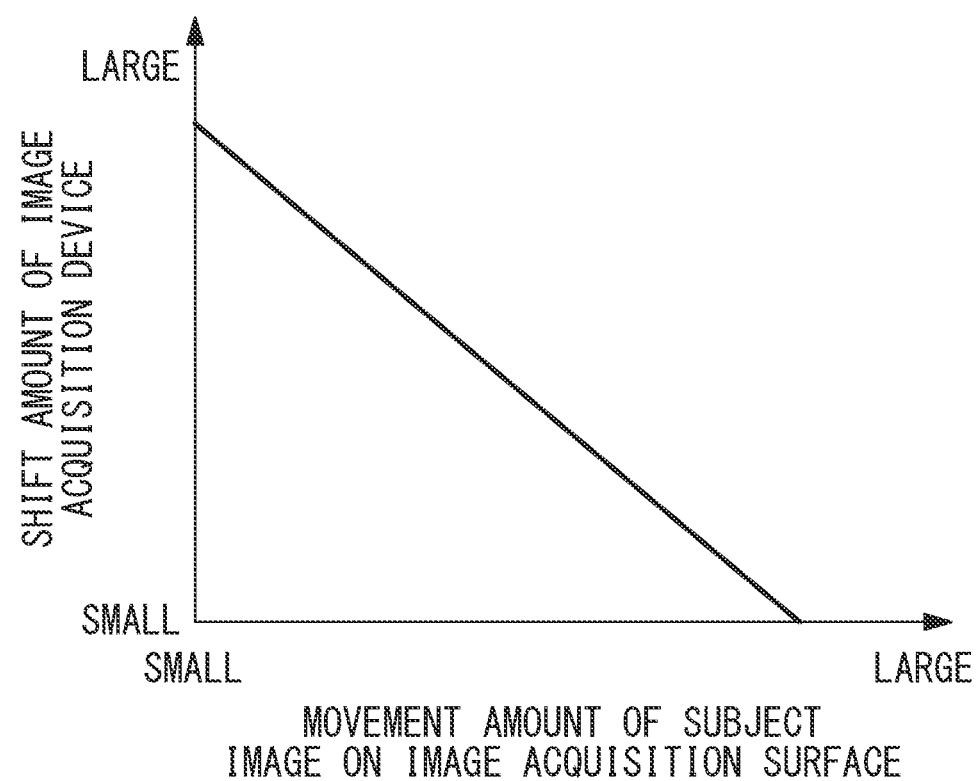
FIG. 3 FIG. 3 is a graph showing an example of a characteristic relationship between the movement amount of the subject image on the image acquisition surface and the shift amount of an image acquisition device.

The shift-amount calculating portion 7 calculates a shift amount of the image acquisition device 2 on the basis of the movement amount input from the subject-image movement-amount calculating portion 6 and outputs the shift amount to the shift control portion 8. For example, as shown in FIG. 3, the shift-amount calculating portion 7 converts the movement amount of the subject image to the shift amount of the image acquisition device 2 in accordance with a prescribed characteristic relationship between the movement amount of the subject image on the image acquisition surface 2a and the shift amount of the image acquisition device 2. The characteristic relationship shown in FIG. 3 is merely an example, and the characteristic relationship can be changed so long as the condition that the shift amount of the image acquisition device 2 increases with a decrease in the movement amount of the subject image is satisfied.

The shift control portion 8 controls the shifting mechanism 4 on the basis of the shift amount input from the shift-amount calculating portion 7 when the image acquisition device 2 performs the main image capturing and causes the image acquisition device 2 to shift by the calculated shift amount between the acquisitions of the plurality of images. Therefore, between the plurality of images, a position displacement of the subject image occurs due to the shift of the image acquisition device 2 in addition to the movements of the image acquisition apparatus 100, such as camera shakes.

Figure 4A:
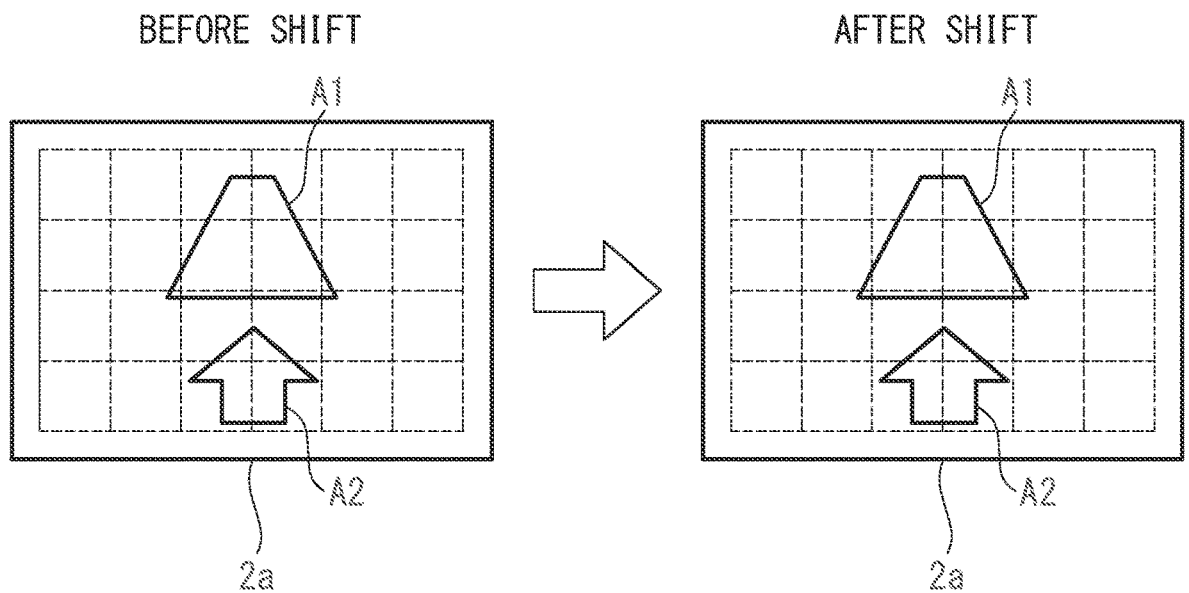
FIG. 4A is a diagram for explaining an example of a shift of the subject image on the image acquisition surface due to a shift of the image acquisition device.
Figure 4B:
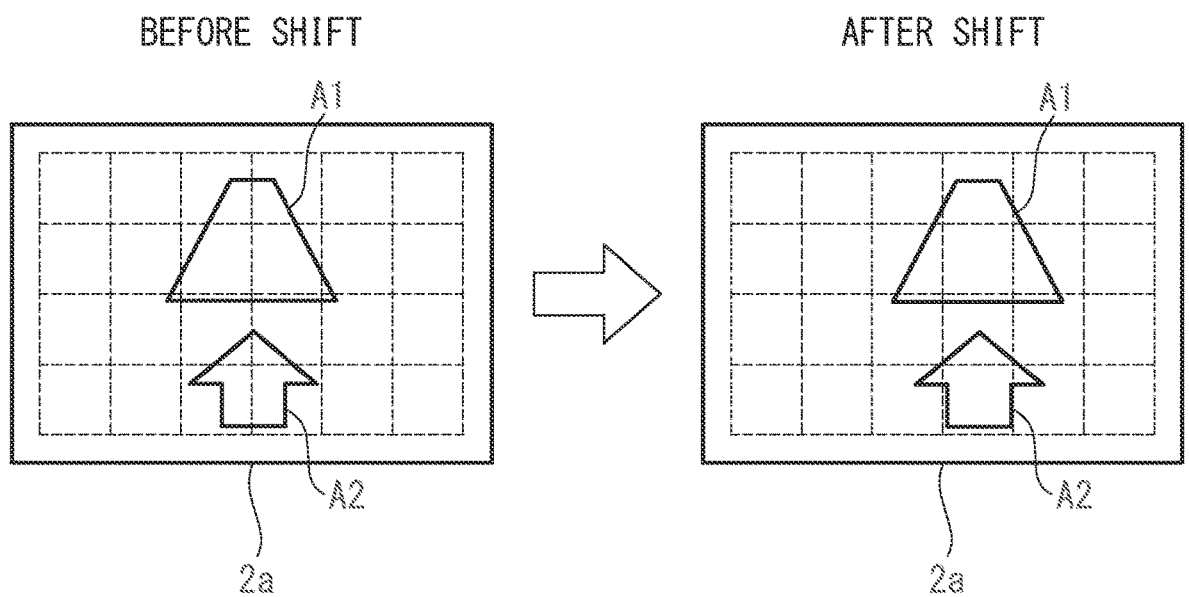
FIG. 4B is a diagram for explaining another example of the shift of the subject image on the image acquisition surface due to the shift of the image acquisition device.

Here, when acquiring the plurality of images, the shift control portion 8 controls the shifting mechanism 4 so that the positions of the subject images on the image acquisition surface 2a are not the same between the plurality of images. FIG. 4A shows a case in which the positions of the subject images A1 and A2 on the image acquisition surface 2a are the same before and after shifting the image acquisition device 2, and FIG. 4B shows a case in which the positions of the subject images A1 and A2 on the image acquisition surface 2a are different between before and after shifting the image acquisition device 2.

The combining processing portion 9 reads out the plurality of images acquired in the main image capturing from the frame memory 3 and acquires the movement information obtained from the plurality of images acquired in the main image capturing from the movement information acquisition portion 5. Next, the combining processing portion 9 arranges the plurality of images in a high-resolution image space while aligning the plurality of images with respect to each other on the basis of the movement information. The high-resolution image space has a greater number of pixels than the number of pixels of each of the plurality of images and has a higher resolution than the resolution of each of the plurality of images. Next, the combining processing portion 9 generates a combined image by combining the plurality of images that have been aligned. The combined image generated in this way is an ultra-high-resolution image having a higher resolution than the individual images.

For example, the combining processing portion 9 places pixels of the reference image in the high-resolution image space and, subsequently, places pixels of other images at pixels that are shifted from the pixels of the reference image by distances in accordance with the movement information. In the case in which empty pixels, where pixels of none of the images are placed after the pixels of all of the images are placed in the high-resolution image space, exist in the high-resolution image space, the combining processing portion 9 may interpolate information of the empty pixels by using, for example, information of pixels surrounding the empty pixels.

The combined image is output to an image processing portion (not shown) from the combining processing portion 9. The image processing portion generates an output image by applying image processing, such as color processing and gradation conversion processing, to the combined image.

Next, the operation of the image acquisition apparatus 100 will be described with reference to FIG. 5.

Before the main image capturing, the movement amount of a subject image on the image acquisition surface 2a is calculated (step S1). Specifically, the image acquisition device 2 executes the pre-image capturing and acquires a plurality of pre-images. The plurality of acquired pre-images are stored in the frame memory 3, and, subsequently, the movement information acquisition portion 5 acquires the movement information of a subject between the pre-images, and the subject-image movement-amount calculating portion 6 calculates the movement amount of the subject image on the image acquisition surface 2a from the movement information. Next, the shift-amount calculating portion 7 calculates the shift amount from the movement amount of the subject image (step S2). The shift amount increases with a decrease in the movement amount of the subject image.

Next, the image acquisition device 2 executes the main image capturing and acquires a plurality of images (steps S3 and S4). During the main image capturing, the shift control portion 8 controls the shifting mechanism 4 and the image acquisition device 2 is shifted between the image acquisitions (step S5). In other words, after acquiring one image (step S3), the image acquisition device 2 is shifted (step S5), and the next image is subsequently acquired (step S3). The shift amount of the image acquisition device 2 at this time increases with a decrease in the movement of the image acquisition apparatus 100, for example, camera shake, during the pre-image capturing. The image acquisitions and shifting of the image acquisition device 2 are repeated in an alternating manner until a prescribed number of (for example, eight) images required to generate a high-resolution combined image are acquired ("YES" in step S4).

Upon storing the plurality of acquired images in the frame memory 3 after the main image capturing, the movement information acquisition portion 5 subsequently acquires the movement information of the subject between the plurality of images (step S6). Next, the combining processing portion 9 aligns and combines the plurality of images on the basis of the movement information, and, consequently, a high-resolution combined image is generated (step S7).

In order to stably achieve an image resolution enhancement effect based on combining a plurality of images, it is necessary to have a certain amount of displacement in the positions of the subject between the plurality of images. However, with the movement of the image acquisition apparatus 100 alone during the main image capturing, it is sometimes not possible to achieve the amount of subject position displacement between the plurality of images required to achieve a high image resolution enhancement effect. For example, in the case in which camera shake during the main image capturing is small, a plurality of images in which the subject has nearly no position displacement are acquired.

With this embodiment, before the main image capturing, the movement amount of the subject image on the image acquisition surface 2a based on the movement of the image acquisition apparatus 100 is calculated from the pre-images. Then, the shift amount of the image acquisition device 2 between image acquisitions is changed in accordance with the movement amount of the subject image, and the shift amount increases with a decrease in the movement amount of the subject image. Accordingly, a plurality of images that have the amount of subject position displacement required to achieve the image resolution enhancement effect are reliably acquired, and the difference in the amount of subject position displacement between the plurality of images based on the difference in the magnitude of the movement of the image acquisition apparatus 100 is suppressed. From such a plurality of images, it is possible to generate an ultra-high-resolution combined image having a higher definition than the individual images, and it is possible to stably achieve the image resolution enhancement effect regardless of the magnitude of the movement of the image acquisition apparatus 100.

Specifically, in the case in which the movement amount of the subject image on the image acquisition surface 2a during the pre-image capturing is small, the movement amount of the subject image on the image acquisition surface 2a during the main image capturing is also expected to be small. In this case, between the image acquisitions during the main image capturing, the image acquisition device 2 is shifted by a larger shift amount. Accordingly, in the case in which the movement of the image acquisition apparatus 100 is small, it is possible to reliably acquire a plurality of images having the amount of subject position displacement required to achieve the image resolution enhancement effect.

On the other hand, in the case in which the movement amount of the subject image on the image acquisition surface 2a during the pre-image capturing is large, the movement amount of the subject image on the image acquisition surface 2a during the main image capturing is also expected to be large. In this case, between the image acquisitions during the main image capturing, the image acquisition device 2 is shifted by a smaller shift amount. Accordingly, in the case in which the movement of the image acquisition apparatus 100 is large, it is also possible to acquire a plurality of images having the amount of subject position displacement required to achieve the image resolution enhancement effect.

In this embodiment, the pre-image capturing may be performed just once before the main image capturing or the pre-image capturing may be performed multiple times before and during the main image capturing. In other words, a plurality of pre-images may be acquired just once before acquiring a plurality of images, or the plurality of pre-images may be acquired before acquiring each of the plurality of images.

In the case in which the pre-image capturing is performed just once before the main image capturing, the required number of the pre-images and amounts of calculation by the respective portions 5, 6, and 7 are decreased.

In the case in which the pre-image capturing is performed multiple times before and during the main image capturing, it is possible to more accurately calculate the movement amount of the subject image on the image acquisition surface 2a. This is advantageous in the case in which the movement of the subject image differs in each image acquisition during the main image capturing, for example, the case of a moving subject.

Modification of First Embodiment

In the first embodiment, the shift amount of the image acquisition device 2 is calculated from the movement amount on the image acquisition surface 2a during the pre-image capturing, and the image acquisition device 2 is shifted by the calculated shift amount between the image acquisitions during the main image capturing, and thus, a plurality of images having the amount of subject position displacement required to achieve an image resolution enhancement effect are acquired.

As a method for changing the subject position displacement amount, there is a method in which the optical system 1 is shifted with respect to the image acquisition device 2 in addition to the method in which the image acquisition device 2 is shifted as in the first embodiment.

This modification is provided with a shifting mechanism, such as an ultrasonic actuator, provided in the optical system 1, instead of the shifting mechanism 4, and the optical system 1 is shifted parallel to the image acquisition surface 2a of the image acquisition device 2.

Figure 5:
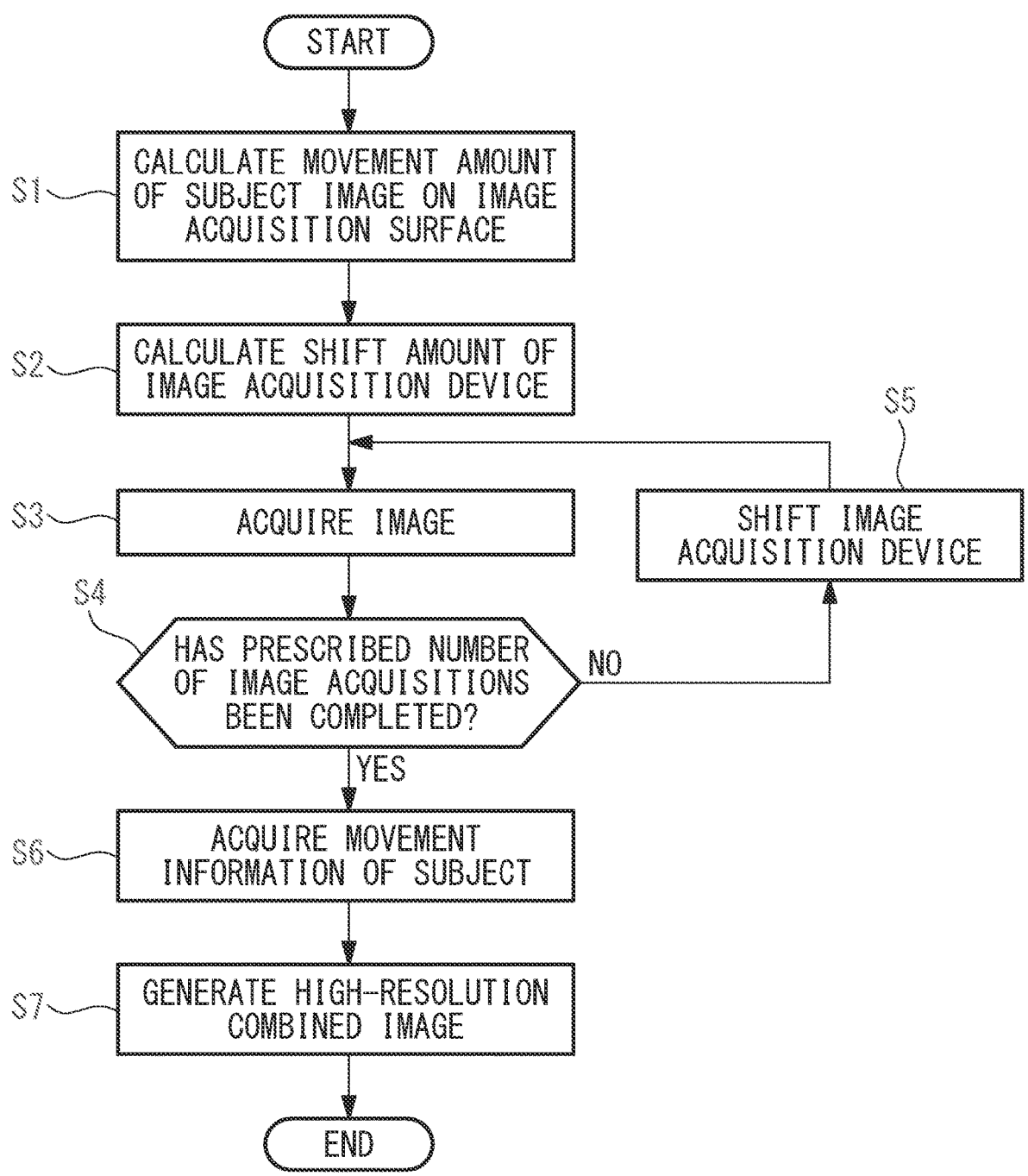
FIG. 5 FIG. 5 is a flowchart showing the operation of the image acquisition apparatus in FIG. 1.

The operation of this modification differs from the case in which the image acquisition device 2 is shifted in that the optical system 1 is shifted in step S5 in the flowchart shown in FIG. 5, and other operations of this modification are the same as in the case in which the image acquisition device 2 is shifted.

In the other embodiments, described below, a shifting mechanism that causes the optical system 1 to shift may also be employed instead of the shifting mechanism 4.

Second Embodiment

Next, an image acquisition apparatus 200 according to a second embodiment of the present invention will be described with reference to the drawings.

In this embodiment, configurations that are different from those of the first embodiment will be described, and configurations that are the same as those of the first embodiment will be given the same reference signs, and the descriptions thereof will be omitted.

Figure 6:
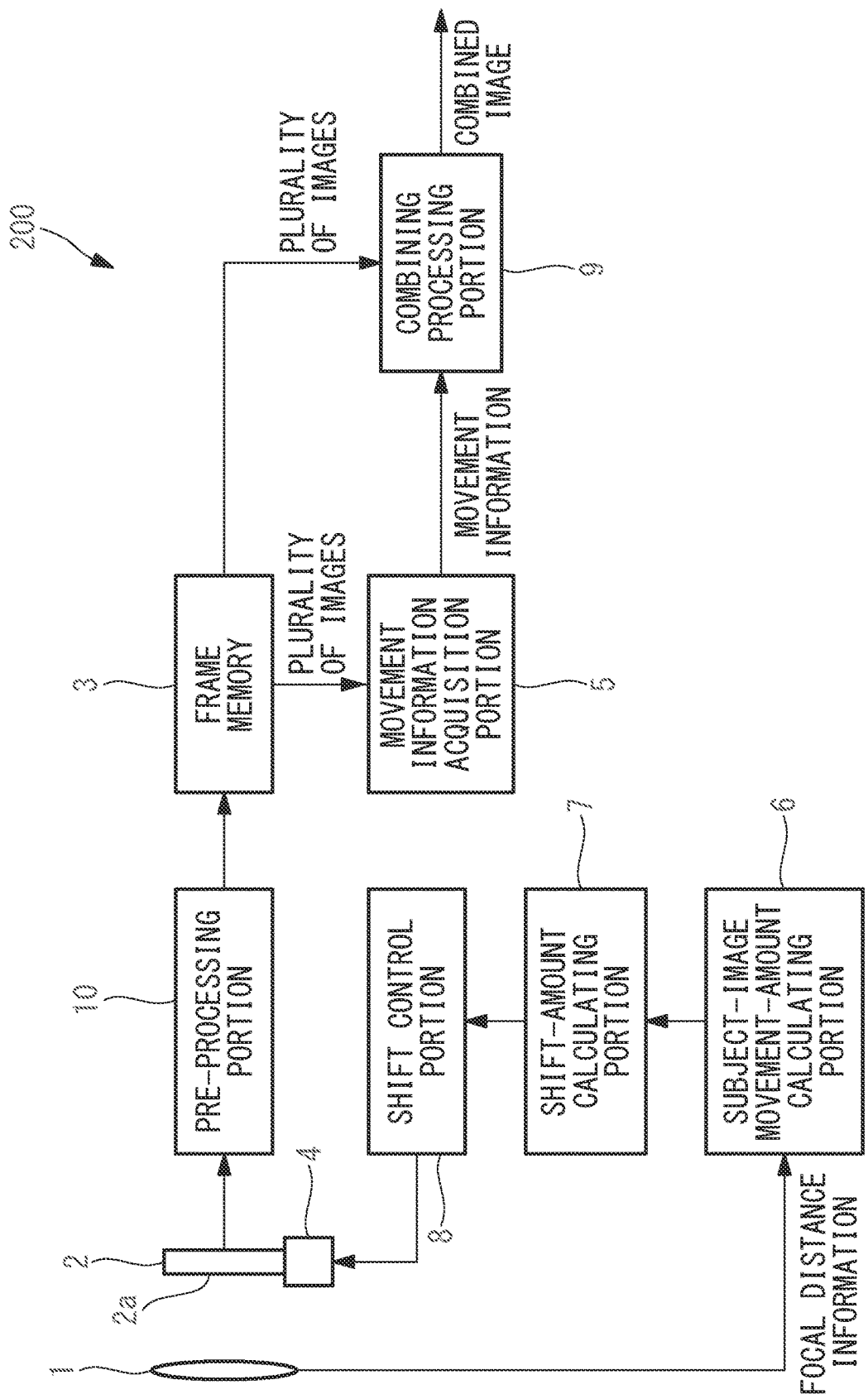
FIG. 6 FIG. 6 is a configuration diagram of an image acquisition apparatus according to a second embodiment of the present invention.

The image acquisition apparatus 200 according to this embodiment has the same apparatus configuration as the image acquisition apparatus 100 of the first embodiment. Specifically, as shown in FIG. 6, the image acquisition apparatus 200 includes the optical system 1, the image acquisition device 2, the frame memory 3, the shifting mechanism 4, the movement information acquisition portion 5, the subject-image movement-amount calculating portion 6, the shift-amount calculating portion 7, the shift control portion 8, and the combining processing portion 9.

However, this embodiment differs from the first embodiment in terms of the processing performed by the subject-image movement-amount calculating portion 6. In addition, this embodiment does not require the pre-image capturing performed by the image acquisition device 2 and the acquisition of the movement information of the subject between the plurality of pre-images performed by the movement information acquisition portion 5.

The subject-image movement-amount calculating portion 6 calculates the movement amount of the subject image on the image acquisition surface 2a on the basis of the focal distance of the optical system 1. The calculated movement amount of the subject image decreases with a decrease in the focal distance. For example, the subject-image movement-amount calculating portion 6 calculates the movement amount by using a prescribed conversion equation for converting the focal distance to the movement amount. In one example, the conversion equation is equation (1) below.

$$[\text{Movement amount of subject image on image acquisition surface } 2a] = C1 * T1 * F1/(A1 - F1). \quad (1)$$

Here, F1 is the focal distance of the optical system 1, and C1, T1, and A1 are arbitrary constant parameters.

The focal distance of the optical system 1 may be variable.

For example, a plurality of optical systems 1 having different focal distances may be prepared, and the focal distance may be changed by replacing the optical system 1 attached to the image acquisition apparatus 200. In this case, each of the optical systems 1 is provided with a storage device storing focal distance information thereof, such as an IC tag. The subject-image movement-amount calculating portion 6 acquires the focal distance information from the storage device of the optical system 1 attached to the image acquisition apparatus 200. Alternatively, the principal control portion may recognize the optical system 1 attached to the image acquisition apparatus 200, and the subject-image movement-amount calculating portion 6 may acquire the focal distance information from the principal control portion.

Alternatively, the optical system 1 may be a zoom optical system in which the focal distance can be changed. In this case, the subject-image movement-amount calculating portion 6 acquires the focal distance information from, for example, the optical system 1 or the principal control portion.

Figure 7A:
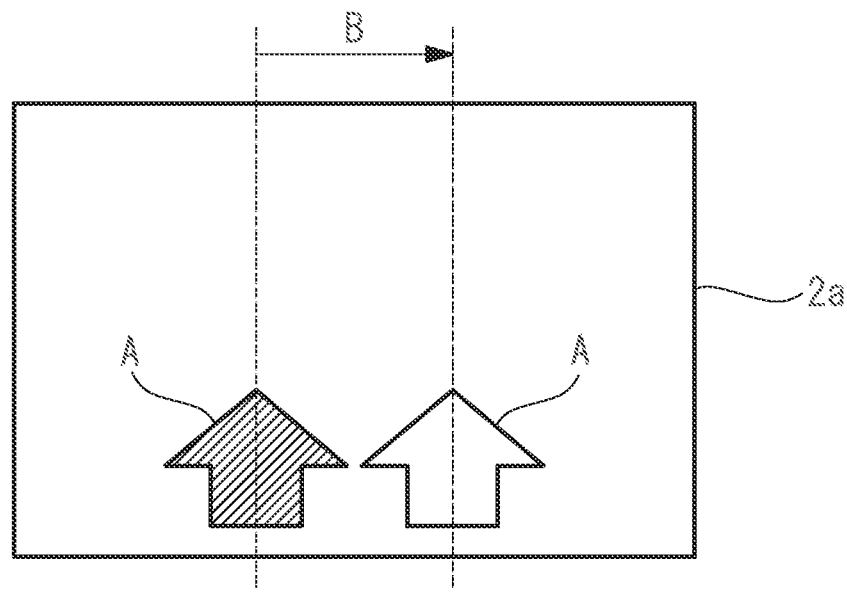
FIG. 7A is a diagram for explaining the movement amount of the subject image on the image acquisition surface in the case in which the focal distance is small.
Figure 7B:
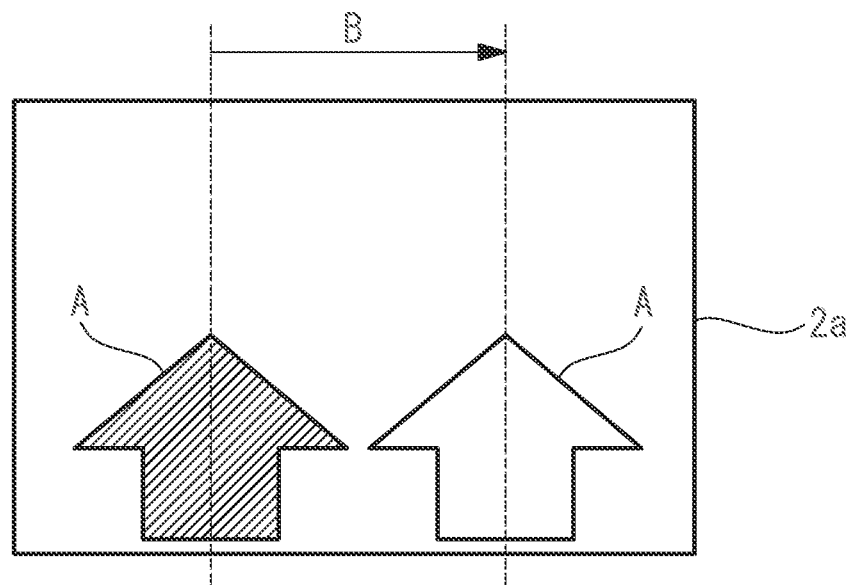
FIG. 7B is a diagram for explaining the movement amount of the subject image on the image acquisition surface in the case in which the focal distance is large.

FIGS. 7A and 7B show examples of the movement amount of the subject image A on the image acquisition surface 2a based on the movement of the image acquisition apparatus 200. FIG. 7A shows the case of wide-angle image capturing in which the focal distance of the optical system 1 is small. FIG. 7B shows the case of telephoto image capturing in which the focal distance of the optical system 1 is large. In general, the angle of view of the optical system 1 increases with a decrease in the focal distance of the optical system 1. Therefore, as shown in FIGS. 7A and 7B, the movement amount (the length of arrow B) of the subject image A on the image acquisition surface 2a decreases with a decrease in the focal distance of the optical system 1.

With this embodiment, before the image capturing performed by the image acquisition device 2, the movement amount of the subject image on the image acquisition surface 2a based on the movement of the image acquisition apparatus 200 is calculated from the focal distance of the optical system 1. Then, the shift amount of the image acquisition device 2 between the image acquisitions is changed in accordance with the movement amount of the subject image, and the shift amount increases with a decrease in the movement amount of the subject image. Accordingly, as with the first embodiment, it is possible to achieve a stable image resolution enhancement effect regardless of the magnitude of the movement of the image acquisition apparatus 200.

Specifically, in the case of wide-angle image capturing performed by the optical system 1 having a small focal distance, the movement amount of the subject image on the image acquisition surface 2a during the image capturing is expected to be small. In this case, between the acquisitions of the plurality of images, the image acquisition device 2 is shifted by a larger shift amount. Accordingly, in the case in which the movement amount of the image acquisition apparatus 200 is small, it is possible to reliably acquire a plurality of images having the amount of subject position displacement required to achieve the image resolution enhancement effect.

On the other hand, in the case of telephoto image capturing performed by the optical system 1 having a large focal distance, the movement amount of the subject image on the image acquisition surface 2a during the image capturing is expected to be large. In this case, between the acquisitions of the plurality of images, the image acquisition device 2 is shifted by a smaller shift amount. Accordingly, in the case in which the movement amount of the image acquisition apparatus 200 is large, it is also possible to acquire a plurality of images having the amount of subject position displacement required to achieve the image resolution enhancement effect.

Third Embodiment

Next, an image acquisition apparatus 300 according to a third embodiment of the present invention will be described with reference to the drawings.

In this embodiment, configurations that are different from those of the first embodiment will be described, and configurations that are the same as those of the first embodiment will be given the same reference signs, and the descriptions thereof will be omitted.

Figure 8:
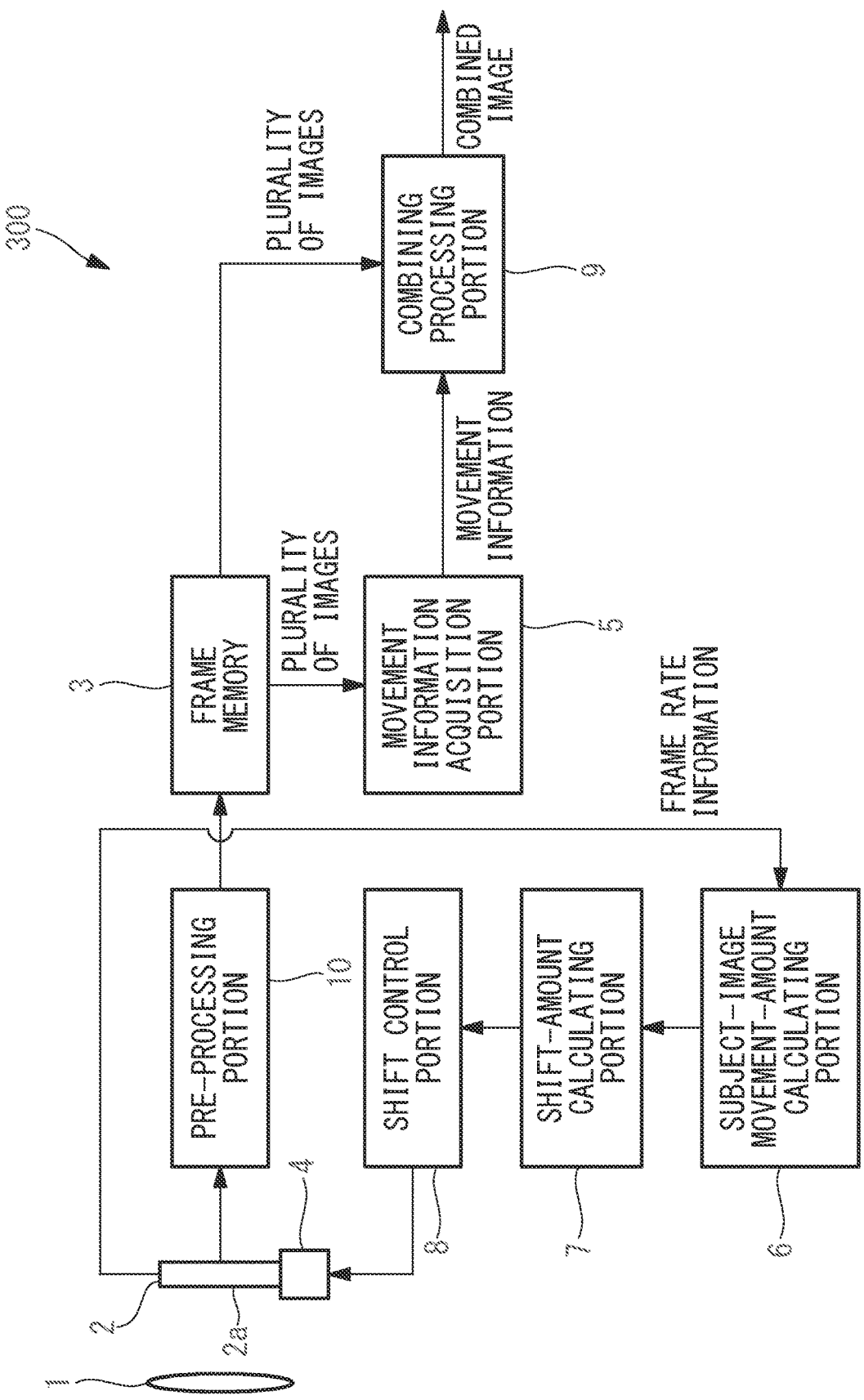
FIG. 8 FIG. 8 is a configuration diagram of an image acquisition apparatus according to a third embodiment of the present invention.

The image acquisition apparatus 300 according to this embodiment has the same apparatus configuration as the image acquisition apparatus 100 of the first embodiment. Specifically, as shown in FIG. 8, the image acquisition apparatus 300 includes the optical system 1, the image acquisition device 2, the frame memory 3, the shifting mechanism 4, the movement information acquisition portion 5, the subject-image movement-amount calculating portion 6, the shift-amount calculating portion 7, the shift control portion 8, and the combining processing portion 9.

However, this embodiment differs from the first embodiment in terms of the processing performed by the subject-image movement-amount calculating portion 6. In addition, this embodiment does not require the pre-image capturing performed by the image acquisition device 2 and the acquisition of the movement information of the subject between the plurality of pre-images performed by the movement information acquisition portion 5.

The subject-image movement-amount calculating portion 6 acquires frame-rate information of the plurality of images from the image acquisition device 2 or the principal control portion that controls the operation of the image acquisition device 2. Next, the subject-image movement-amount calculating portion 6 calculates the movement amount of the subject image on the image acquisition surface 2a on the basis of the frame rate. The calculated movement amount of the subject image on the image acquisition surface 2a increases with a decrease in the frame rate.

For example, the subject-image movement-amount calculating portion 6 calculates the movement amount by using a prescribed conversion equation for converting the frame rate to the movement amount. In one example, the conversion equation is equation (2) below.

$$[\text{Movement amount of subject image on image acquisition surface } 2a] = C2 * T2 * F2 / (A2 - F2). \quad (2)$$

Here, T2 is the inverse of the frame rate of the plurality of images, and C2, F2, and A2 are arbitrary constant parameters.

Figure 9A:
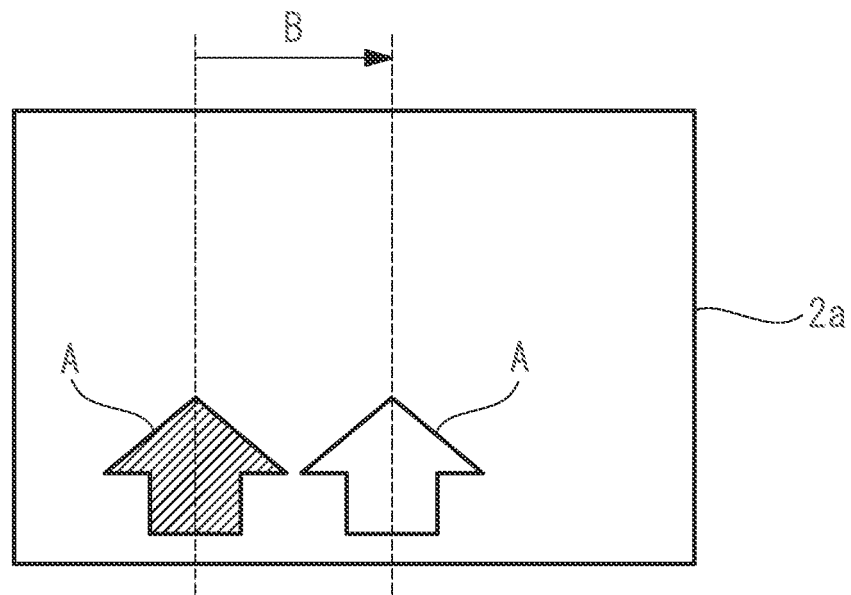
FIG. 9A is a diagram for explaining the movement amount of the subject image on the image acquisition surface in the case in which the frame rate is high.
Figure 9B:
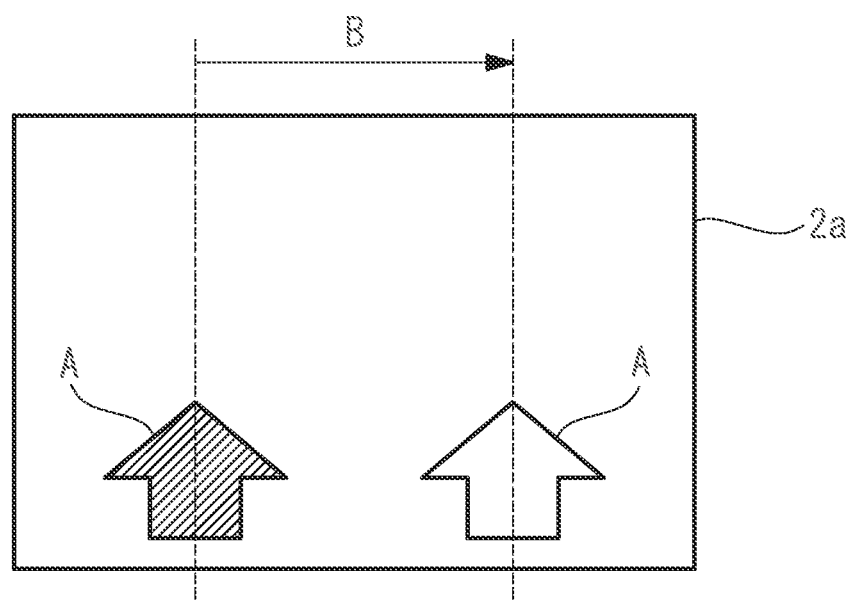
FIG. 9B is a diagram for explaining the movement amount of the subject image on the image acquisition surface in the case in which the frame rate is low.

FIGS. 9A and 9B show examples of the movement amount of the subject image on the image acquisition surface 2a based on the movement of the image acquisition apparatus 300. FIG. 9A shows a case in which the frame rate is high, in other words, a case in which the time interval between one image and the next image is small. FIG. 9B shows a case in which the frame rate is low, in other words, a case in which the time interval between one image and the next image is large. As shown in FIGS. 9A and 9B, the movement amount of the subject image on the image acquisition surface 2a between the image acquisitions decreases with an increase in the frame rate, and the movement amount calculated by the subject-image movement-amount calculating portion 6 also decreases.

With this embodiment, before the image capturing performed by the image acquisition device 2, the movement amount of the subject image on the image acquisition surface 2a based on the movement of the image acquisition apparatus 300 is calculated from the frame rate of the plurality of images. Then, the shift amount of the image acquisition device 2 between the image acquisitions is changed in accordance with the movement amount of the subject image, and the shift amount increases with a decrease in the movement amount of the subject image. Accordingly, as with the first embodiment, it is possible to achieve a stable image resolution enhancement effect regardless of the magnitude of the movement of the image acquisition apparatus 300.

Specifically, in the case in which the frame rate is high, the movement amount of the subject image on the image acquisition surface 2a between the image acquisitions is expected to be small. In this case, between the acquisitions of the plurality of images, the image acquisition device 2 is shifted by a large shift amount. Accordingly, in the case in which the movement amount of the image acquisition apparatus 300 is small, it is possible to reliably acquire a plurality of images having the amount of subject position displacement required to achieve the image resolution enhancement effect.

On the other hand, in the case in which the frame rate is low, the movement amount of the subject image on the image acquisition surface 2a between the image acquisitions is expected to be large. In this case, between the acquisitions of the plurality of images, the image acquisition device 2 is shifted by a smaller shift amount. Accordingly, in the case in which the movement amount of the image acquisition apparatus 300 is large, it is also possible to acquire a plurality of images having the amount of subject position displacement required to achieve the image resolution enhancement effect.

In this embodiment, the total image capturing time from the start of the acquisitions of the plurality of images to the end of the acquisitions thereof or a time interval between two images that are adjacent in the time direction may be employed instead of the frame rate.

In the case of the total image capturing time, it is possible to prevent excessive shifting of the image acquisition device 2 in the case in which the movement amount of the subject image is sufficient over all of the plurality of images. The total image capturing time increases with an increase in the number of images or a decrease in the frame rate.

In the case of the time interval between two images, as with the case of the frame rate, it is possible to calculate the movement amount of the subject image between two images that are adjacent in the time direction.

Fourth Embodiment

Next, an image acquisition apparatus 400 according to a fourth embodiment of the present invention will be described with reference to the drawings.

In this embodiment, configurations that are different from those of the first embodiment will be described, and configurations that are the same as those of the first embodiment will be given the same reference signs, and the descriptions thereof will be omitted.

Figure 10:
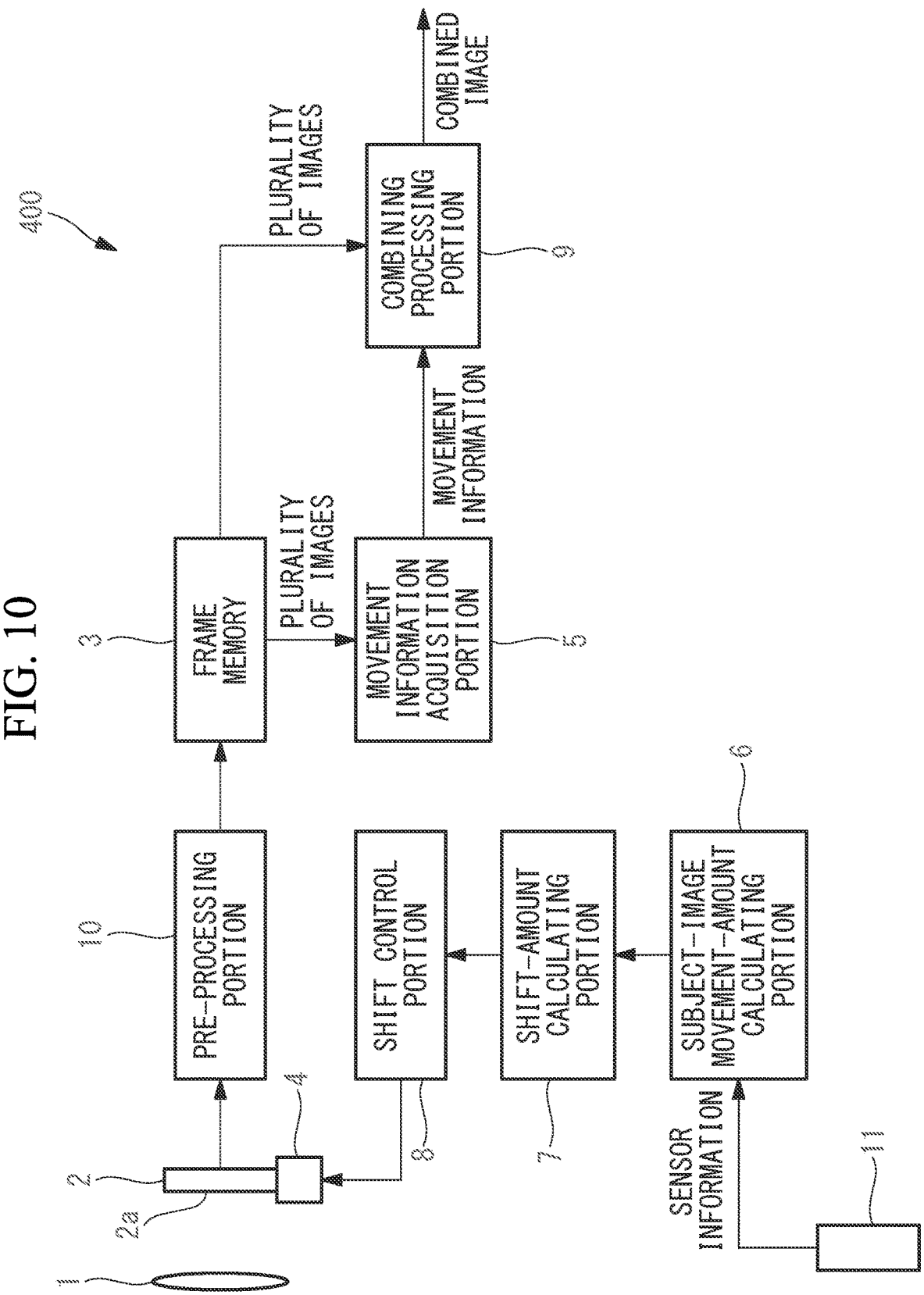
FIG. 10 FIG. 10 is a configuration diagram of an image acquisition apparatus according to a fourth embodiment of the present invention.

As shown in FIG. 10, the image acquisition apparatus 400 according to this embodiment includes a sensor 11 in addition to the optical system 1, the image acquisition device 2, the frame memory 3, the shifting mechanism 4, the movement information acquisition portion 5, the subject-image movement-amount calculating portion 6, the shift-amount calculating portion 7, the shift control portion 8, and the combining processing portion 9.

This embodiment does not require the pre-image capturing performed by the image acquisition device 2 and the acquisition of the movement information of the subject between the plurality of pre-images performed by the movement information acquisition portion 5.

The sensor 11 is a motion sensor that detects the movement of the entire image acquisition apparatus 400 and is fixed with respect to the optical system 1. The movement of the image acquisition apparatus 400 refers to a physical movement of the image acquisition apparatus 400 due to camera shake or the like when a user captures an image of a subject by using the image acquisition apparatus 400. For example, the sensor 11 is an acceleration sensor. The sensor 11 may be another type of sensor that is capable of detecting the movement of the image acquisition apparatus 400, for example, an angular velocity sensor. The sensor 11 may be fixed with respect to the image acquisition device 2 instead of being fixed with respect to the optical system 1.

The subject-image movement-amount calculating portion 6 calculates the movement amount of the subject image on the image acquisition surface 2*a* on the basis of the movement of the image acquisition apparatus 400 detected by the sensor 11. The calculated movement amount of the subject image decreases with a decrease in the movement of the image acquisition apparatus 400.

In the case in which the sensor 11 is an acceleration sensor, the subject-image movement-amount calculating portion 6 calculates the movement of the image acquisition apparatus 400 by integrating, twice, the acceleration detected by the acceleration sensor 11 with respect to time. Then, for example, the subject-image movement-amount calculating portion 6 calculates the movement amount by using a prescribed conversion equation for converting the movement amount of the image acquisition apparatus 400 to the movement amount of the subject image on the image acquisition surface 2*a*. In one example, the conversion equation is equation (3) below.

[Movement amount of subject image on image acquisition surface $2a$]=$C3*T3*F3/(A3-F3)$. (3)

Here, C3 is the movement amount of the image acquisition apparatus 400, and T3, F3, and A3 are arbitrary constant parameters.

Figure 11A:
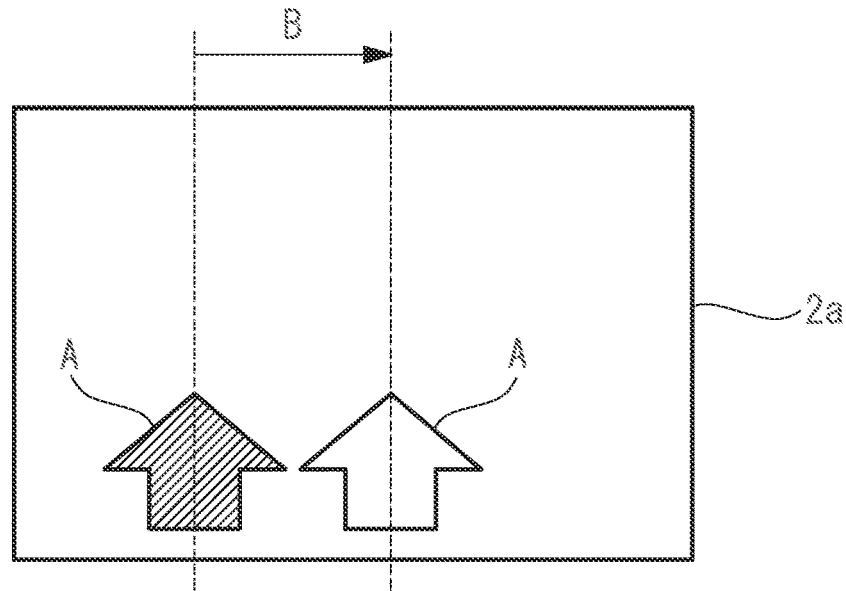
FIG. 11A is a diagram for explaining the movement amount of the subject image on the image acquisition surface in the case in which the movement of the image acquisition apparatus is small.
Figure 11B:
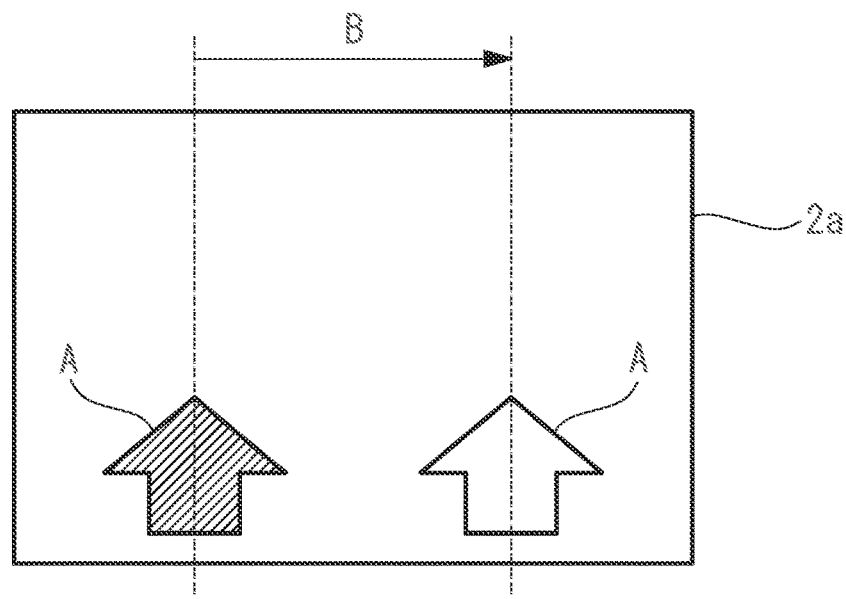
FIG. 11B is a diagram for explaining the movement amount of the subject image on the image acquisition surface in the case in which the movement of the image acquisition apparatus is large.

FIGS. 11A and 11B show examples of the movement amount of the subject image on the image acquisition surface 2*a* based on the movement of the image acquisition apparatus 400. FIG. 11A shows a case in which the movement of the image acquisition apparatus 400 is small. FIG. 11B shows a case in which the movement of the image acquisition apparatus 400 is large. As shown in FIGS. 11A and 11B, the movement amount of the subject image on the image acquisition surface 2*a* decreases with a decrease in the movement of the image acquisition apparatus 400, and the movement amount calculated by the subject-image movement-amount calculating portion 6 also decreases.

With this embodiment, before the image capturing performed by the image acquisition device 2, the sensor 11 detects the movement of the image acquisition apparatus 400, and the movement amount of the subject image on the image acquisition surface 2*a* based on the movement of the image acquisition apparatus 400 is calculated from the movement of the image acquisition apparatus 400. The detection of the movement by the sensor 11 is performed, for example, immediately before the image acquisition device 2 starts acquiring the plurality of images. Then, the shift amount of the image acquisition device 2 between the image acquisitions is changed in accordance with the movement amount of the subject image, and the shift amount increases with a decrease in the movement amount of the subject image. Accordingly, as with the first embodiment, it is possible to achieve a stable image resolution enhancement effect regardless of the magnitude of the movement of the image acquisition apparatus 400.

Specifically, in the case in which the movement of the image acquisition apparatus 400 before the image capturing is small, the movement amount of the subject image on the image acquisition surface 2*a* during the image capturing is expected to be small. In this case, between the acquisitions of the plurality of images, the image acquisition device 2 is shifted by a larger shift amount. Accordingly, in the case in which the movement amount of the image acquisition apparatus 400 is small, it is possible to reliably acquire a plurality of images having the amount of subject position displacement required to achieve the image resolution enhancement effect.

On the other hand, in the case in which the movement of the image acquisition apparatus 400 before the image capturing is large, the movement amount of the subject image on the image acquisition surface 2*a* during the image capturing is expected to be large. In this case, between the acquisitions of the plurality of images, the image acquisition device 2 is shifted by a smaller shift amount. Accordingly, in the case in which the movement amount of the image acquisition apparatus 400 is large, it is also possible to acquire a plurality of images having the amount of subject position displacement required to achieve the image resolution enhancement effect.

Fifth Embodiment

Next, an image acquisition apparatus 500 according to a fifth embodiment of the present invention will be described with reference to the drawings.

In this embodiment, configurations that are different from those of the first embodiment will be described, and configurations that are the same as those of the first embodiment will be given the same reference signs, and the descriptions thereof will be omitted.

Figure 12:
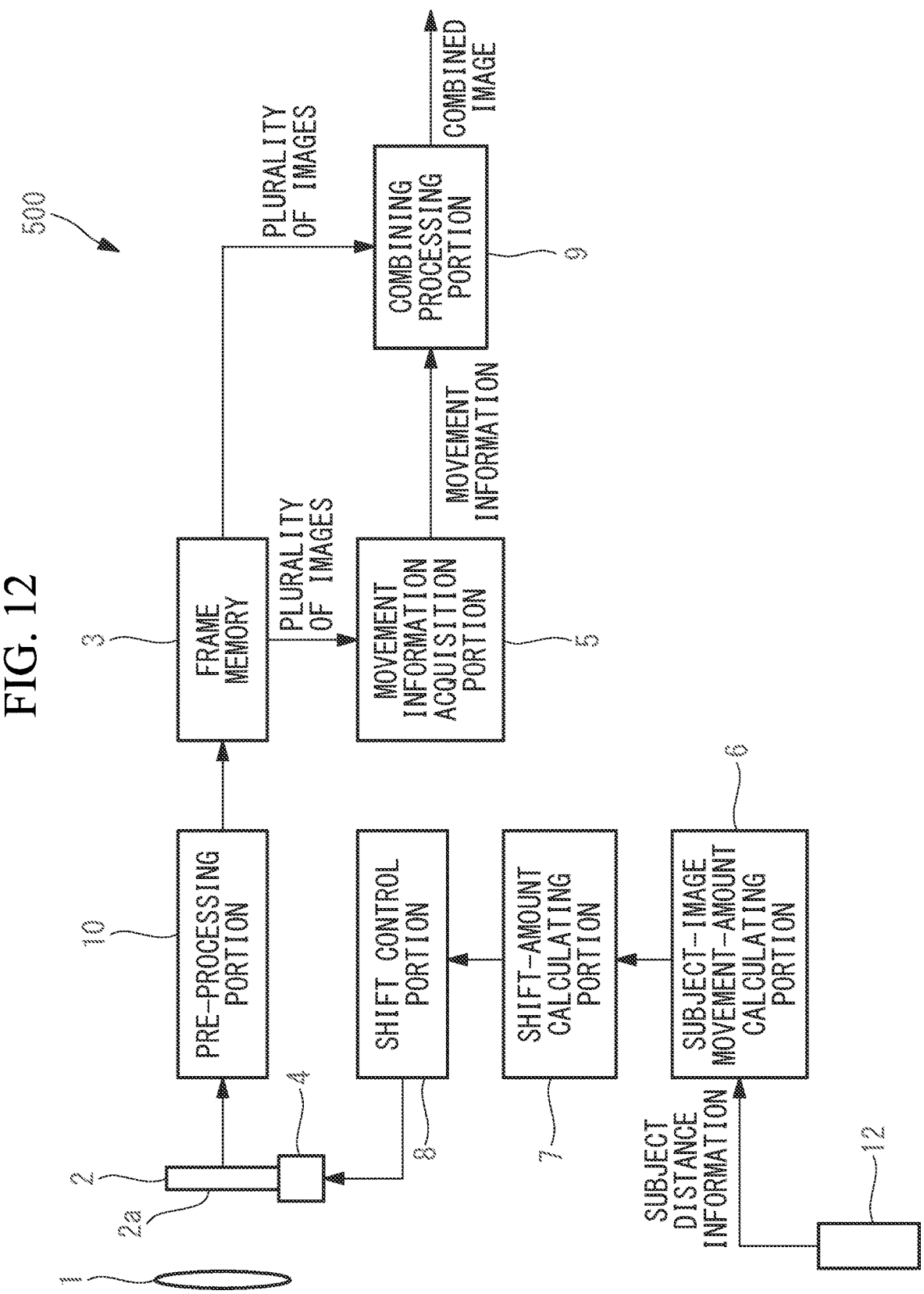
FIG. 12 FIG. 12 is a configuration diagram of an image acquisition apparatus according to a fifth embodiment of the present invention.

As shown in FIG. 12, the image acquisition apparatus 500 according to this embodiment includes a sensor 12 in addition to the optical system 1, the image acquisition device 2, the frame memory 3, the shifting mechanism 4, the movement information acquisition portion 5, the subject-image movement-amount calculating portion 6, the shift-amount calculating portion 7, the shift control portion 8, and the combining processing portion 9.

This embodiment does not require the pre-image capturing performed by the image acquisition device 2 and the acquisition of the movement information of the subject between the plurality of pre-images performed by the movement information acquisition portion 5.

The sensor 12 is a distance sensor that detects a subject distance from a principal point of the optical system 1 to a subject. For example, the sensor 12 is an ultrasonic distance sensor or an optical distance sensor.

The subject-image movement-amount calculating portion 6 calculates the movement amount of the subject image on the image acquisition surface 2*a* on the basis of the subject distance detected by the sensor 12. The calculated movement amount of the subject image decreases with an increase in the subject distance. For example, the subject-image movement-amount calculating portion 6 calculates the movement amount by using a prescribed conversion equation for converting the subject distance to the movement amount. In one example, the conversion equation is equation (4) below.

[Movement amount of subject image on image acquisition surface 2a]=$C4*T4*F4/(A4-F4)$. (4)

Here, A4 is the subject distance, and C4, T4, and F4 are arbitrary constant parameters.

Figure 13A:
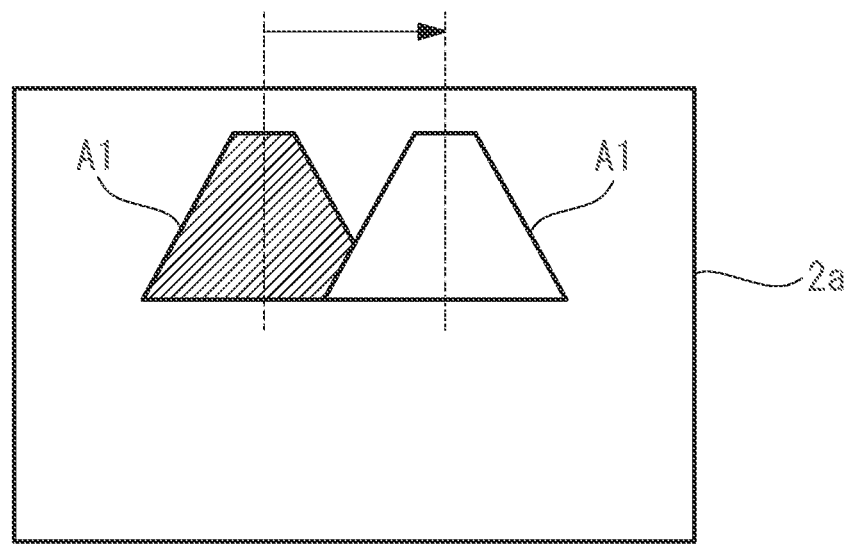
FIG. 13A is a diagram for explaining the movement amount of the subject image on the image acquisition surface in the case in which the subject distance is large.
Figure 13B:
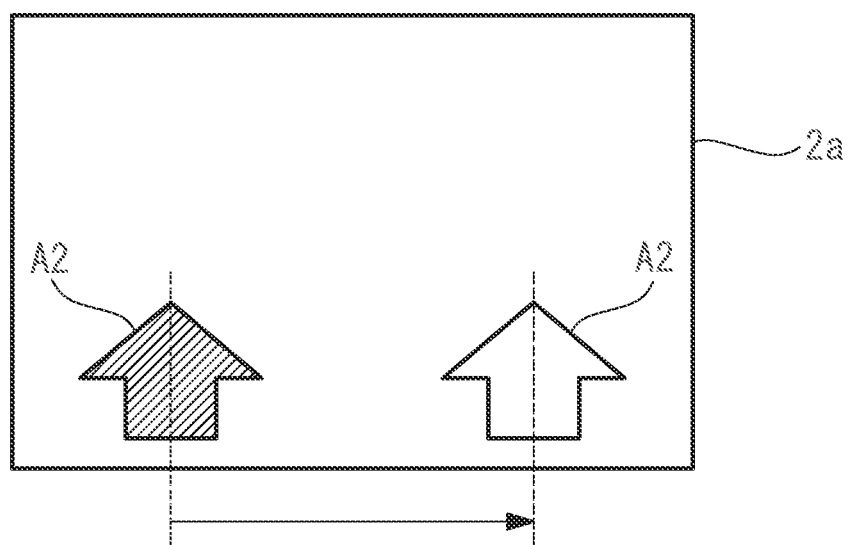
FIG. 13B is a diagram for explaining the movement amount of the subject image on the image acquisition surface in the case in which the subject distance is small.

FIGS. 13A and 13B show examples of movement amounts of subject images A1 and A2 on the image acquisition surface 2a based on the movement of the image acquisition apparatus 500. FIG. 13A shows a case in which the subject A1 is positioned far from the image acquisition apparatus 500 and the subject distance is large. FIG. 13B shows a case in which the subject A2 is positioned close to the image acquisition apparatus 500 and the subject distance is small. As shown in FIGS. 13A and 13B, the movement amounts (the lengths of arrows B) of the subject images A1 and A2 on the image acquisition surface 2a decrease with an increase in the subject distance.

With this embodiment, before the image capturing performed by the image acquisition device 2, the sensor 12 detects the subject distance, and the movement amount of the subject image on the image acquisition surface 2a based on the movement of the image acquisition apparatus 500 is calculated from the subject distance. The detection of the subject distance by the sensor 12 is performed, for example, immediately before the image acquisition device 2 starts to acquire the plurality of images. Then, the shift amount of the image acquisition device 2 between the image acquisitions is changed in accordance with the movement amount of the subject image, and the shift amount increases with a decrease in the movement amount of the subject image. Accordingly, as with the first embodiment, it is possible to achieve a stable image resolution enhancement effect regardless of the magnitude of the movement of the image acquisition apparatus 500.

Specifically, in the case in which the subject distance is large, the movement amount of the subject image on the image acquisition surface 2a during the image capturing is expected to be small. In this case, between the acquisitions of the plurality of images, the image acquisition device 2 is shifted by a larger shift amount. Accordingly, in the case in which the movement amount of the image acquisition apparatus 500 is small, it is possible to reliably acquire a plurality of images having the amount of subject position displacement required to achieve the image resolution enhancement effect.

On the other hand, in the case in which the subject distance is small, the movement amount of the subject image on the image acquisition surface 2a during the image capturing is expected to be large. In this case, between the acquisitions of the plurality of images, the image acquisition device 2 is shifted by a smaller shift amount. Accordingly, in the case in which the movement amount of the image acquisition apparatus 500 is large, it is also possible to acquire a plurality of images having the amount of subject position displacement required to achieve the image resolution enhancement effect.

Figure 13C:
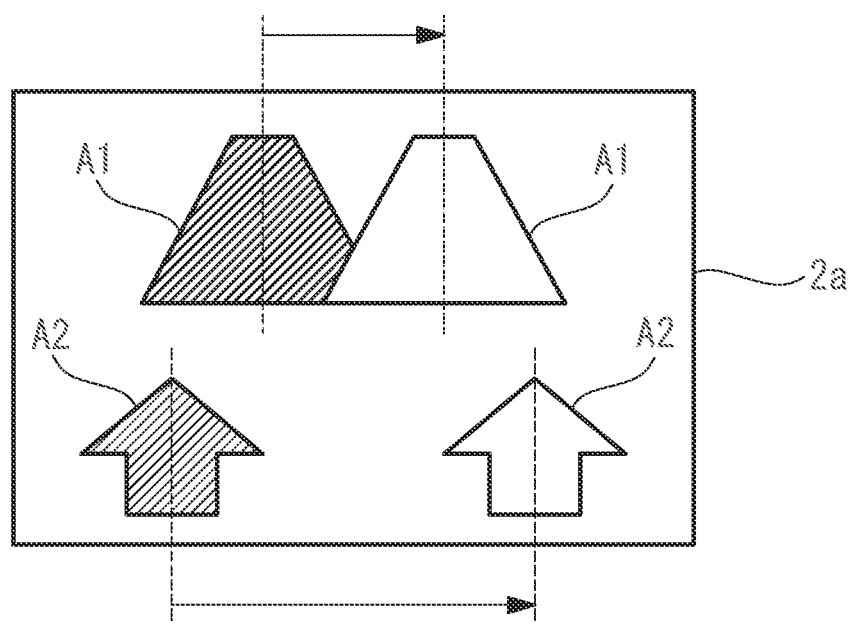
FIG. 13C is a diagram for explaining the movement amounts of a plurality of subject images on the image acquisition surface, the subject images having subject distances that are different from each other.

In this embodiment, in the case of a scene including a plurality of subjects A1 and A2, as shown in FIG. 13C, the subject-image movement-amount calculating portion 6 may detect a subject of interest from the plurality of subjects A1 and A2 and may calculate the movement amount from the subject distance of the subject of interest. For example, the subject-image movement-amount calculating portion 6 detects, among a plurality of focus points detected by an auto focus function, a subject at a focus point selected by the user or an automatically selected focus point as the subject of interest. Alternatively, the subject-image movement-amount calculating portion 6 may detect the subject of interest by using other means, such as image recognition technology.

Sixth Embodiment

Next, an image acquisition apparatus 600 according to a sixth embodiment of the present invention will be described with reference to the drawings.

In this embodiment, configurations that are different from those of the first to fifth embodiments will be described, and configurations that are the same as those of the first to fifth embodiments will be given the same reference signs, and the descriptions thereof will be omitted.

Figure 14:
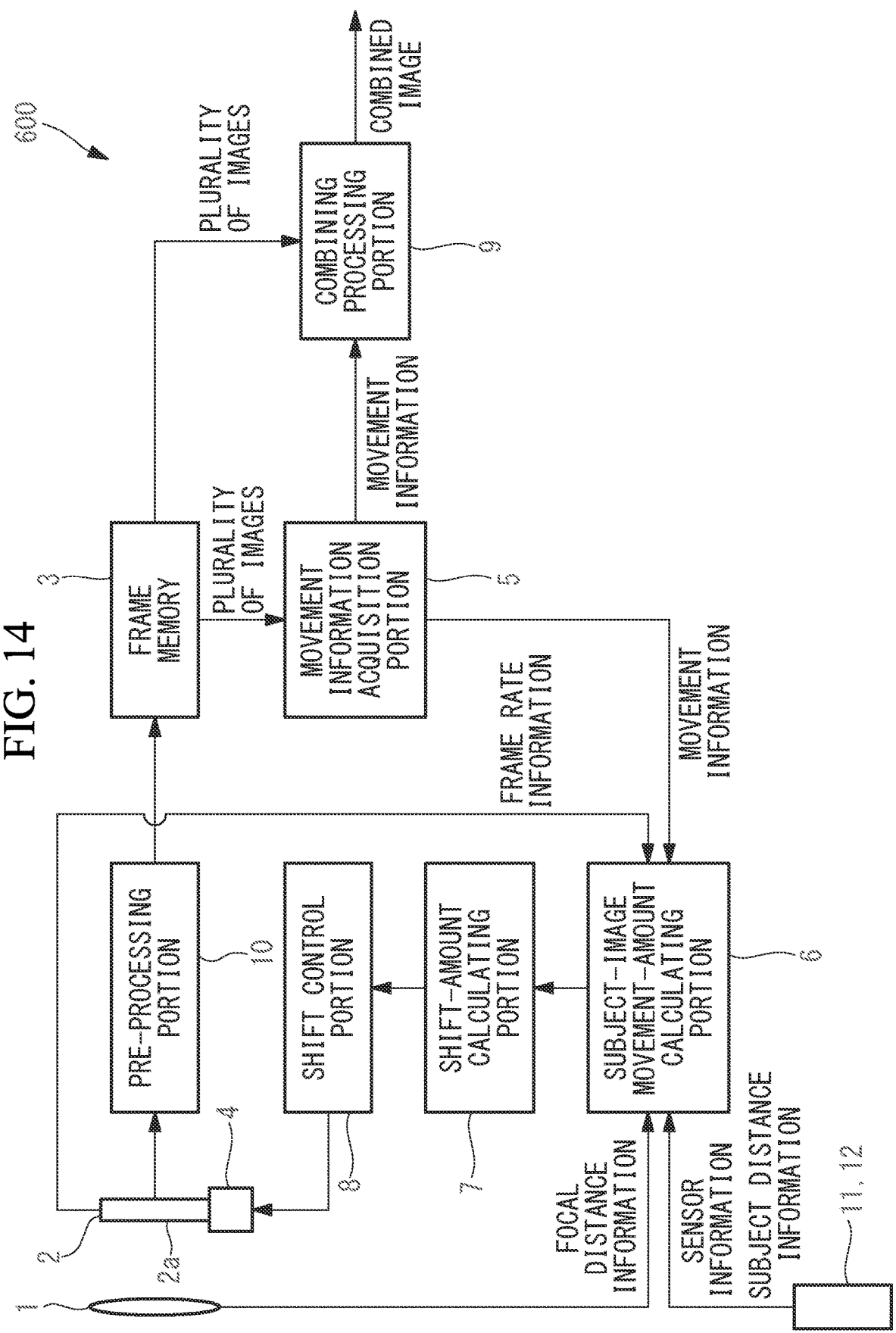
FIG. 14 is a configuration diagram of an image acquisition apparatus according to a sixth embodiment of the present invention.

As shown in FIG. 14, the image acquisition apparatus 600 according to this embodiment includes the optical system 1, the image acquisition device 2, the frame memory 3, the shifting mechanism 4, the movement information acquisition portion 5, the subject-image movement-amount calculating portion 6, the shift-amount calculating portion 7, the shift control portion 8, the combining processing portion 9, the sensor 11, and the sensor 12.

The subject-image movement-amount calculating portion 6 calculates the movement amount of the subject image on the image acquisition surface 2a on the basis of the focal distance of the optical system 1, the frame rate of the plurality of images, the movement of the image acquisition apparatus 600 detected by the sensor 11, and the subject distance detected by the sensor 12. For example, the subject-image movement-amount calculating portion 6 calculates the movement amount by using a prescribed conversion equation for converting the focal distance, the frame rate, the movement of the image acquisition apparatus 600, and the subject distance to the movement amount of the subject image on the image acquisition surface 2a. In one example, the conversion equation is equation (5) below.

[Movement amount of subject image on image acquisition surface 2a]=$C5*T5*F5/(A5-F5)$. (5)

Here, C5 is the movement amount of the image acquisition apparatus 600, T5 is the reciprocal of the frame rate of the plurality of images, F5 is the focal distance of the optical system 1, and A5 is the subject distance.

With this embodiment, the movement amount of the subject image on the image acquisition surface 2a and the shift amount of the image acquisition device 2 are more appropriately calculated on the basis of the focal distance, the frame rate, the movement of the image acquisition apparatus 600, and the subject distance. Accordingly, it is possible to achieve a stable image resolution enhancement effect regardless of the magnitude of the movement of the image acquisition apparatus 600.

In this embodiment, the subject-image movement-amount calculating portion 6 calculates the movement amount of the subject image on the basis of the focal distance, the frame rate, the movement of the image acquisition apparatus 600, and the subject distance; however, alternatively, the movement amount of the subject image may be calculated on the basis of two or more parameters arbitrarily selected from the focal distance, the frame rate, the movement of the image acquisition apparatus 600, and the subject distance.

In the above-described individual embodiments, the image acquisition apparatuses 100, 200, 300, 400, 500, and 600 may have a camera-shake correction function and may execute both the shifting of the image acquisition device 2 for the image resolution enhancement and the shifting of the image acquisition device 2 for camera shake correction. The shifting of the image acquisition device 2 for camera shake correction is performed in one of or both of a light exposure period and a non-light exposure period of the image acquisition device 2. The shift amount of the image acquisition device 2 for camera shake correction is separately calculated from the shift amount of the image acquisition device 2 for the image resolution enhancement.

In the above-described individual embodiments, the calculations of the movement amount of the subject image on the image acquisition surface 2a and the shift amount of the image acquisition device 2 are performed before the acquisitions of the plurality of images; however, in addition thereto or alternatively, the calculations may be performed between the acquisitions of the plurality of images.

For example, the movement amount of the subject and the shift amount of the image acquisition device 2 may be calculated after a first image is acquired and a second image may be acquired after shifting the image acquisition device 2 by the calculated shift amount. Similarly, the movement amount of the subject and the shift amount of the image acquisition device 2 may be calculated after the second image is acquired and a third image may be acquired after shifting the image acquisition device 2 by the calculated shift amount.

In addition, in the above-described individual embodiments, the cases in which the present invention is applied to a digital camera have mainly been described; however, the present invention may be applied to other types of image acquisition apparatuses with which images are acquired, such as an endoscope or a microscope.

The following aspects can be also derived from the embodiments.

An aspect of the present invention is an image acquisition apparatus that combines a plurality of images acquired in a time sequential manner and generates a combined image having a higher resolution than each of the plurality of images, the image acquisition apparatus including: an optical system that forms a subject image by focusing light coming from a subject; an image acquisition device that has an image acquisition surface on which the subject image is formed and that acquires the plurality of images; a shifting mechanism that causes the image acquisition device and the optical system to relatively shift in a direction parallel to the image acquisition surface; a movement-amount calculating portion that calculates a movement amount of the subject image on the image acquisition surface; a shift-amount calculating portion that calculates a relative shift amount of the image acquisition device and the optical system on the basis of the movement amount of the subject image, wherein the shift amount increases with a decrease in the movement amount of the subject image; and a shift control portion that causes, by controlling the shifting mechanism, the image acquisition device and the optical system to relatively shift, between acquisitions of the plurality of images, by the shift amount calculated by the shift-amount calculating portion.

With this aspect, the plurality of images of the subject are acquired as a result of the image acquisition device acquiring the subject image formed on the image acquisition surface multiple times by means of the optical system. When acquiring the plurality of images, the image acquisition device and the optical system are relatively shifted by the shifting mechanism between the image acquisitions. Accordingly, between the plurality of images, a position displacement of the subject based on the relative shifts of the image acquisition device and the optical system occurs in addition to a position displacement of the subject based on the movement of the image acquisition apparatus. In this way, it is possible to generate a combined image having a higher resolution from the plurality of images having position displacements of the subject.

In this case, the amounts by which the image acquisition device and the optical system are relatively shifted by means of the shifting mechanism are changed in accordance with the movement amount of the subject image on the image acquisition surface. Specifically, the movement-amount calculating portion calculates the movement amount of the subject image on the image acquisition surface, and the shift-amount calculating portion calculates the shift amount that increases with a decrease in the movement amount of the subject image. Then, the shift control potion controls the shift amount caused by the shifting mechanism so as to achieve the calculated shift amount. Accordingly, regardless of the magnitude of the movement of the image acquisition apparatus, it is possible to achieve a stable image resolution enhancement effect as a result of stabilizing the position displacement amount of the subject between the plurality of images.

In the above-described aspect, the shifting mechanism may be an actuator that is provided in the image acquisition device and that causes the image acquisition device to shift with respect to the optical system in the direction parallel to the image acquisition surface. Alternatively, the shifting mechanism may be an actuator that is provided in the optical system and that causes the optical system to shift with respect to the image acquisition device in the direction parallel to the image acquisition surface.

In the above-described aspect, the image acquisition device may acquire a plurality of pre-images before acquiring the plurality of images, and the movement-amount calculating portion may calculate the movement amount of the subject image on the image acquisition surface from a movement amount of the subject between the plurality of pre-images.

The movement amount of the subject between the pre-images represents the movement of the image acquisition apparatus when acquiring the pre-images, and the movement of the image acquisition apparatus when acquiring the plurality of images is expected to decrease with a decrease in the movement amount of the subject between the pre-images. Therefore, it is possible to precisely calculate, on the basis of the movement amount of the subject between the pre-images, the movement amount of the subject image on the image acquisition surface when acquiring the plurality of images.

In the above-described aspect, the movement-amount calculating portion may calculate the movement amount of the subject image on the image acquisition surface from a focal distance of the optical system.

The movement amount of the subject image on the image acquisition surface based on the movement of the image acquisition apparatus decreases with a decrease in the focal distance of the optical system. Therefore, it is possible to precisely calculate the movement amount of the subject image on the image acquisition surface on the basis of the focal distance of the optical system.

In the above-described aspect, the movement-amount calculating portion may calculate the movement amount of the subject image on the image acquisition surface from a frame rate of the plurality of images.

The movement amount of the subject image on the image acquisition surface, based on the movement of the image acquisition apparatus, between the image acquisitions decreases with an increase in the frame rate of the plurality of images. Therefore, it is possible to precisely calculate the movement amount of the subject image on the image acquisition surface on the basis of the frame rate.

The above-described aspect may include an acceleration sensor fixed with respect to the optical system, wherein the movement-amount calculating portion may calculate the movement amount of the subject image on the image acquisition surface from an acceleration detected by the acceleration sensor.

The movement of the image acquisition apparatus is obtained from the acceleration detected by the acceleration sensor. Therefore, it is possible to precisely calculate the movement amount of the subject image on the image acquisition surface on the basis of the acceleration detected by the acceleration sensor.

In the above-described aspect, the movement-amount calculating portion may calculate the movement amount of the subject image on the image acquisition surface from a subject distance from the optical system to the subject.

The movement amount of the subject image on the image acquisition surface based on the movement of the image acquisition apparatus decreases with an increase in the subject distance. Therefore, it is possible to precisely calcuate the movement amount of the subject image on the image acquisition surface on the basis of the subject distance.

Another aspect of the present invention is an image acquisition apparatus that combines a plurality of images acquired in a time sequential manner and generates a combined image having a higher resolution than each of the plurality of images, the image acquisition apparatus including: an image acquisition device that has an image acquisition surface, on which a subject image is formed by means of an optical system focusing light coming from a subject, and that acquires the plurality of images; a shifting mechanism that causes the image acquisition device to shift with respect to the optical system in a direction parallel to the image acquisition surface; a movement-amount calculating portion that calculates a movement amount of the subject image on the image acquisition surface; a shift-amount calculating portion that calculates a shift amount of the image acquisition device on the basis of the movement amount of the subject image, wherein the shift amount increases with a decrease in the movement amount of the subject image; and a shift control portion that causes, by controlling the shifting mechanism, the image acquisition device to shift, between acquisitions of the plurality of images, by the shift amount calculated by the shift-amount calculating portion.

REFERENCE SIGNS LIST 1 optical system
2 image acquisition device
2a image acquisition surface
4 shifting mechanism
6 subject-image movement-amount calculating portion (movement-amount calculating portion)
7 shift-amount calculating portion
8 shift control portion
9 combining processing portion
11 sensor, acceleration sensor
100, 200, 300, 400, 500, 600 image acquisition apparatus
A, A1, A2 subject image

The invention claimed is:

1. An image acquisition apparatus that combines a plurality of images acquired in a time sequential manner and generates a combined image having a higher resolution than each of the plurality of images, the image acquisition apparatus comprising:
   an optical system that comprises a lens and that forms a subject image by focusing light coming from a subject;
   an image acquisition device that has an image acquisition surface on which the subject image is formed and that acquires the plurality of images;
   a shifting mechanism that causes the image acquisition device and the optical system to relatively shift in a direction parallel to the image acquisition surface; and
   a processor comprising hardware, the processor being configured to:
      calculate a movement amount of the subject image on the image acquisition surface;
      calculate a relative shift amount of the image acquisition device and the optical system on the basis of the movement amount of the subject image, wherein the shift amount increases with a decrease in the movement amount of the subject image; and
      cause, by controlling the shifting mechanism, the image acquisition device and the optical system to relatively shift, between acquisitions of the plurality of images, by the calculated shift amount,
   wherein the image acquisition device acquires a plurality of pre-images before acquiring the plurality of images, and
   the processor is configured to calculate the movement amount of the subject image on the image acquisition surface from a movement amount of the subject between the plurality of pre-images.

2. The image acquisition apparatus according to claim 1, wherein the shifting mechanism comprises an actuator that is provided in the image acquisition device and that causes the image acquisition device to shift with respect to the optical system in the direction parallel to the image acquisition surface.

3. The image acquisition apparatus according to claim 1, wherein the shifting mechanism comprises an actuator that is provided in the optical system and that causes the optical system to shift with respect to the image acquisition device in the direction parallel to the image acquisition surface.

4. An image acquisition apparatus that combines a plurality of images acquired in a time sequential manner and generates a combined image having a higher resolution than each of the plurality of images, the image acquisition apparatus comprising:
   an optical system that comprises a lens and that forms a subject image by focusing light coming from a subject;
   an image acquisition device that has an image acquisition surface on which the subject image is formed and that acquires the plurality of images;
   a shifting mechanism that causes the image acquisition device and the optical system to relatively shift in a direction parallel to the image acquisition surface;
   an acceleration sensor fixed with respect to the optical system; and
   a processor comprising hardware, the processor being configured to:
      calculate a movement amount of the subject image on the image acquisition surface;
      calculate a relative shift amount of the image acquisition device and the optical system on the basis of the movement amount of the subject image, wherein the shift amount increases with a decrease in the movement amount of the subject image; and cause, by controlling the shifting mechanism, the image acquisition device and the optical system to relatively shift, between acquisitions of the plurality of images, by the calculated shift amount, wherein the processor is configured to calculate the movement amount of the subject image on the image acquisition surface from an acceleration detected by the acceleration sensor.

5. A camera body that combines a plurality of images acquired in a time sequential manner and generates a combined image having a higher resolution than each of the plurality of images, the camera body comprising:

an image acquisition device that has an image acquisition surface, on which a subject image is formed by means of an optical system focusing light coming from a subject, and that acquires the plurality of images;

a shifting mechanism that comprises an actuator and that causes the image acquisition device to shift with respect to the optical system in a direction parallel to the image acquisition surface; and a processor comprising hardware, the processor being configured to:

calculate a movement amount of the subject image on the image acquisition surface;

calculate a shift amount of the image acquisition device on the basis of the movement amount of the subject image, wherein the shift amount increases with a decrease in the movement amount of the subject image; and cause, by controlling the shifting mechanism, the image acquisition device to shift, between acquisitions of the plurality of images, by the calculated shift amount, wherein the image acquisition device acquires a plurality of pre-images before acquiring the plurality of images, and the processor is configured to calculate the movement amount of the subject image on the image acquisition surface from a movement amount of the subject between the plurality of pre-images.

* * * * *